(12) United States Patent
Meng

(10) Patent No.: US 7,234,825 B2
(45) Date of Patent: Jun. 26, 2007

(54) CURVED REARVIEW SYSTEM FOR VEHICLES

(76) Inventor: Wei Meng, 9220 Bellwood La., #333, Houston, TX (US) 77036

( * ) Notice: Subject to any disclaimer, the term of this patent is extended or adjusted under 35 U.S.C. 154(b) by 44 days.

(21) Appl. No.: 11/109,737

(22) Filed: Apr. 20, 2005

(65) Prior Publication Data

US 2006/0023323 A1    Feb. 2, 2006

(51) Int. Cl.
G02B 5/10    (2006.01)
G02B 5/08    (2006.01)

(52) U.S. Cl. .................................. 359/864; 359/866
(58) Field of Classification Search ............ 359/850, 359/854, 864, 866, 868, 838
See application file for complete search history.

(56) References Cited

U.S. PATENT DOCUMENTS

| | | | |
|---|---|---|---|
| 2,279,751 A | 4/1942 | Hensley | |
| 2,514,989 A | 7/1950 | Buren | |
| 2,857,810 A | 10/1958 | Troendle | |
| 3,389,952 A | 6/1968 | Tobin, Jr. | |
| 3,501,227 A | 3/1970 | Landen | |
| 3,628,851 A | 12/1971 | Robertson | |
| 3,764,201 A * | 10/1973 | Haile | 359/864 |
| 3,901,587 A | 8/1975 | Haile | |
| 3,972,601 A | 8/1976 | Johnson | |
| 4,258,919 A | 3/1981 | Martelli | |
| 4,264,144 A | 4/1981 | McCord | |
| 4,449,786 A | 5/1984 | McCord | |
| 4,859,046 A | 8/1989 | Traynor et al. | |
| 5,005,962 A | 4/1991 | Edelman | |
| 5,280,386 A | 1/1994 | Johnson | |
| 5,320,556 A | 6/1994 | Otaka et al. | |
| 5,517,367 A | 5/1996 | Kim et al. | |
| 5,579,133 A | 11/1996 | Black et al. | |
| 5,793,542 A | 8/1998 | Kondo et al. | |
| 7,001,032 B2 * | 2/2006 | Lo | 359/868 |
| 2003/0169521 A1 | 9/2003 | Hoegh | |

FOREIGN PATENT DOCUMENTS

FR    2 588 808    4/1987

\* cited by examiner

*Primary Examiner*—Alessandro Amari
(74) *Attorney, Agent, or Firm*—Richard C. Litman

(57) ABSTRACT

The curved rearview mirror system for vehicles allows a driver to see the entire area of a driver's blind spot from looking into any one of three mirrors without giving the driver an overly distorted view. The mirror system includes a central rearview mirror with a central planar section and two side convexly curved sections having a constant radius of curvature. The mirror system also includes left and right side rearview mirrors. Each side rearview mirror includes a central planar section, a convexly curved side section, a convexly curved top section, and a convexly curved bottom section. The shape and placement of each mirror is governed by a series of equations that give the driver the best possible view of the blind spot.

14 Claims, 12 Drawing Sheets

CURVED REARVIEW SYSTEM FOR VEHICLES

BACKGROUND OF THE INVENTION

1. Field of the Invention

The present invention relates to the shape and placement of side and center rearview mirrors on a vehicle that allow a driver to have a complete view of the blind spot.

2. Description of the Related Art

Ordinarily, flat mirrors of rectangular or of substantially rectangular shape are employed as rearview mirrors in automobiles. These mirrors provide the driver with a view through the rear window of the automobile, but the driver ordinarily cannot see automobiles on either side of the driver's automobile that are in a position to pass the driver's automobile, i.e., the driver cannot see other automobiles in his or her "blind spot."

U.S. Pat. No. 2,857,810, issued Jun. 22, 1953 to J. Troendle, discloses a center rearview mirror with a planar central section and two curved sections on the side. The '810 patent, however, does not disclose the best shape and positioning of the mirror to yield the optimal view of the blind spot.

U.S. Patent Publication No. 2003/0169521, published Sep. 11, 2003, discloses a central rearview mirror having curved sides that transition from substantially flat surface having a very large radius of curvature in the middle to a progressively smaller radius of curvature towards the sides of the mirror. U.S. Pat. No. 4,264,144, issued Apr. 28, 1981 to McCord, discloses a similar central rearview mirror having a progressively smaller radius of curvature towards the sides of the mirror. Neither the '521 publication nor the '144 patent, however, discloses the positioning of the mirror that yields the optimal view of the blind spot.

U.S. Pat. No. 4,449,786, issued on May 22, 1984 to R. McCord, discloses a central rearview mirror that is entirely curved. Other central rearview mirrors that are entirely curved are described in U.S. Pat. No. 3,901,587, issued on Aug. 26, 1975 to E. Haile; and U.S. Pat. No. 5,321,556, issued Jun. 14, 1994 to T. Joe. The images produced by rearview mirrors which are entirely curved, however, tend to be distorted.

U.S. Pat. No. 4,331,382, issued on May 25, 1982 to H. Graff, discloses a side rearview mirror having a planar section and an adjacent curved section having a constant radius of curvature. Other Patents disclosing similar side rearview mirrors having a planar section and an adjacent curved section include U.S. Pat. No. 4,258,979, issued on Mar. 31, 1981 to W. Mahin and French Patent No. 2,588, 808, published Apr. 24, 1987. These patents, however, does not disclose the best shapes and positioning of these mirrors that yield the optimal view of the blind spot.

U.S. Pat. No. 3,389,952, issued on Dec. 2, 1964 to J. Tobin, Jr., discloses a side rearview mirror having a planar section with an adjacent spherical side section. Similar side rearview mirrors having a planar section and an adjacent spherical section are disclosed in U.S. Pat. No. 5,005,962, issued Apr. 9, 1991 to K. Edelman; U.S. Pat. No. 5,517,367, issued May 14, 1996 to Kim et al.; and U.S. Pat. No. 5,793,542, issued Aug. 11, 1998 to Kondo et al.

U.S. Pat. No. 2,279,751, issued Apr. 14, 1942 to E. Hensley, discloses a side rearview mirror having four planar sections at different angles. U.S. Pat. No. 2,514,989, issued Jul. 11, 1950 to N. Buren, discloses a similar side rearview mirror having two planar sections of different colors. Similar rearview mirrors with multiple planar sections at different angles are shown in U.S. Pat. No. 3,501,227, issued Mar. 17, 1970 to W. Landen; U.S. Pat. No. 3,628,851, issued Dec. 21, 1971 to H. Robertson; U.S. Pat. No. 3,972,601, issued Aug. 3, 1976 to W. Johnson; U.S. Pat. No. 4,859,046, issued Aug. 22, 1989 to Traynor et al.; and U.S. Pat. No. 5,579,133, issued Nov. 26, 1996 to Black et al.

U.S. Pat. No. 5,280,386, issued Jan. 18, 1994 to D. Johnson, discloses a windshield deflection shield with lenses or rearview mirrors.

None of the above inventions and patents, taken either singly or in combination, is seen to describe the instant invention as claimed. Thus, a curved rearview mirror system for vehicles solving the aforementioned problems is desired.

SUMMARY OF THE INVENTION

The curved rearview mirror system for vehicles of the present invention allows a driver to see the entire area of a driver's blind spot from looking at any one of three mirrors without giving the driver an overly distorted view. The mirror system includes a central rearview mirror having a central planar section and two lateral, convexly curved sections with a constant radius of curvature. The mirror system also includes left and right side-mounted rearview mirrors. Each side rearview mirror includes a central planar section, a convexly curved side section, a convexly curved top section, and a convexly curved bottom section. The shape and placement of each mirror is governed by a series of equations that give the driver the best possible view of the blind spot by selection left and right reference points on the ground spaced laterally from the vehicle. The curved rearview mirror system is adapted for both left hand drive and right hand drive vehicles.

Accordingly, it is a principal object of the invention to provide a curved rearview mirror system that gives a driver an optimal view of the blind spot.

It is another object of the invention to provide improved central and side rearview mirrors that are each placed so that the driver can get a complete view of the blind spot.

It is a further object of the invention to provide mirrors that do not overly distort a reflected image of the blind spot.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to a system of curved rearview mirrors and their placement within an automotive vehicle. There are three curved rearview mirrors. The central rearview mirror has a planar middle section and two side convexly curved side sections. The left side rearview mirror has a planar mid section, a left side convexly curved section, a top convexly curved section, and a bottom convexly curved section. The right side rearview mirror has a planar mid section, a right side convexly curved section, a top convexly curved section, and a bottom convexly curved section.

Figure 1A:
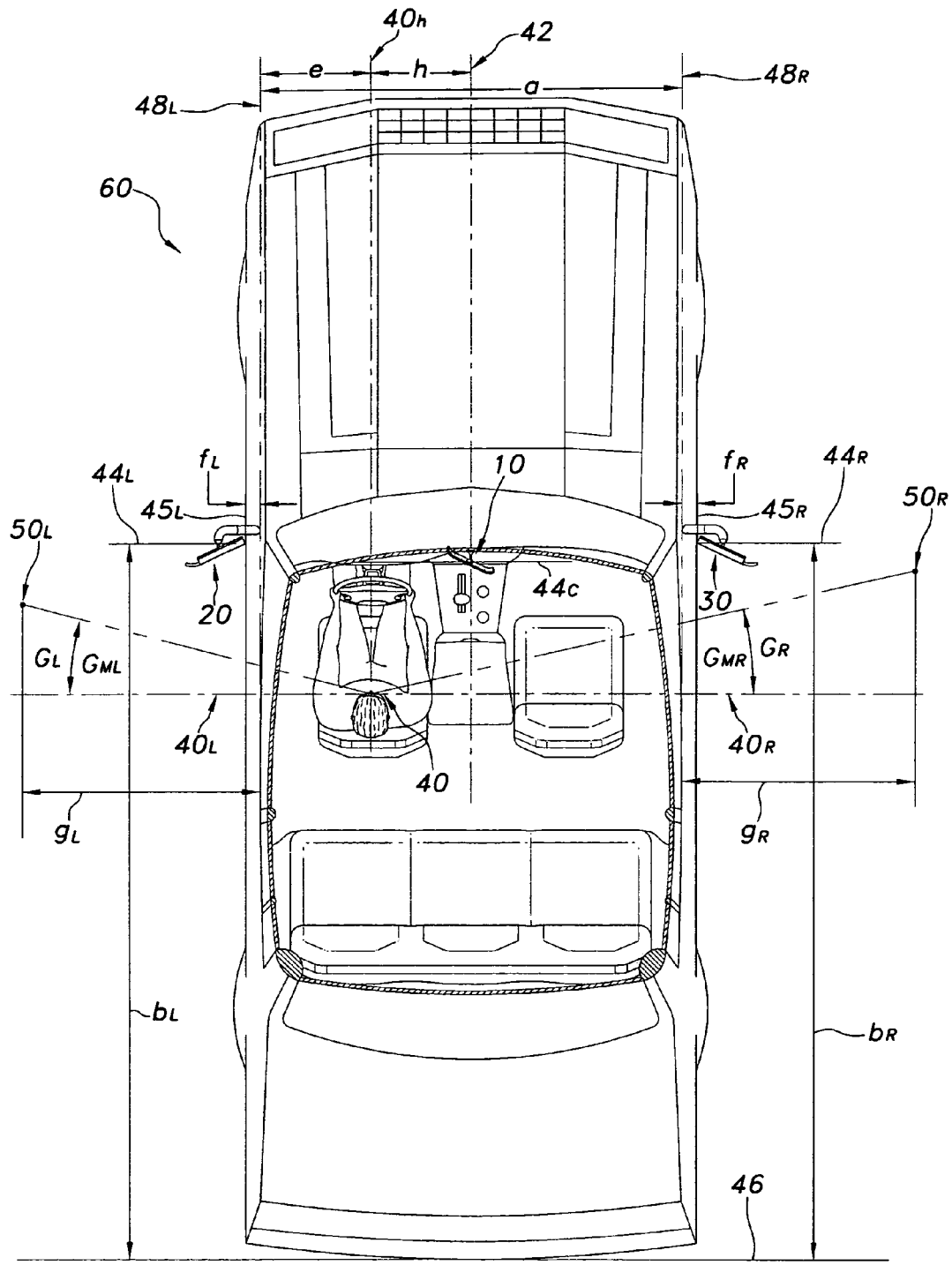
FIG. 1A is an environmental top view of the curved rearview mirror system for left hand drive vehicles according to the present invention.
Figure 1B:
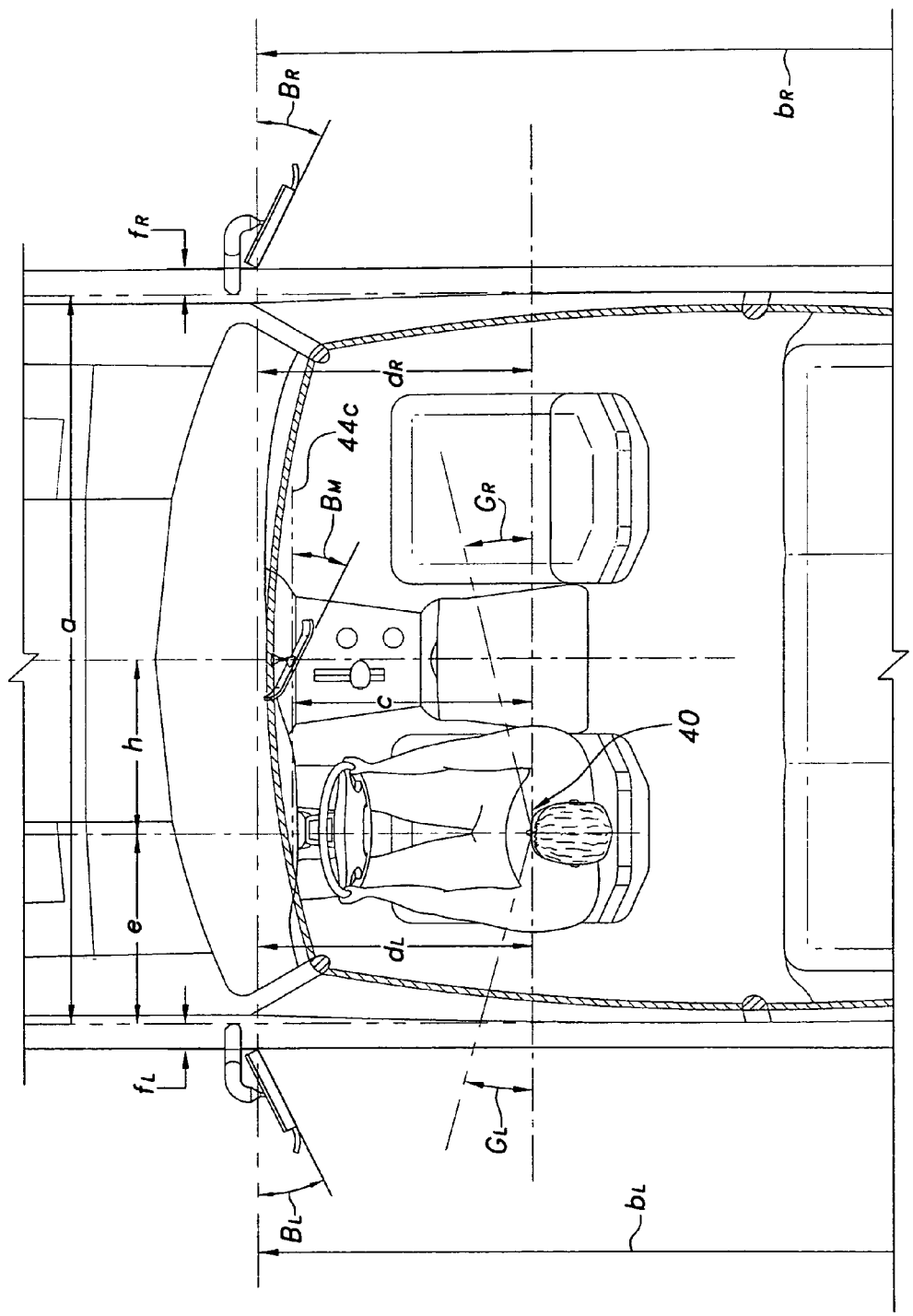
FIG. 1B is a detailed environmental top view of the curved rearview mirror system of FIG. 1A.
Figure 1C:
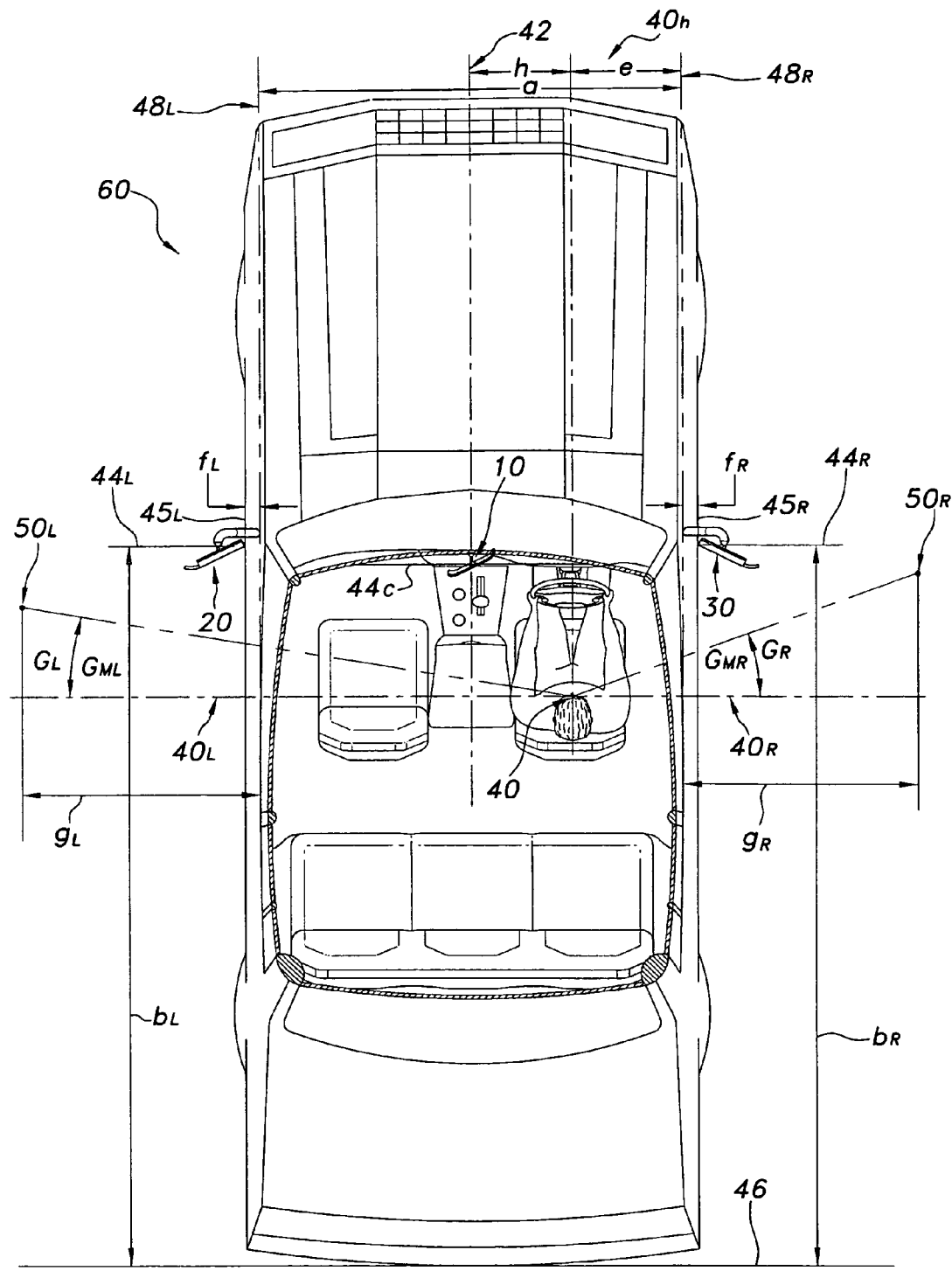
FIG. 1C is an environmental top view of the curved rearview mirror system of FIG. 1A adapted for right hand drive vehicles.
Figure 1D:
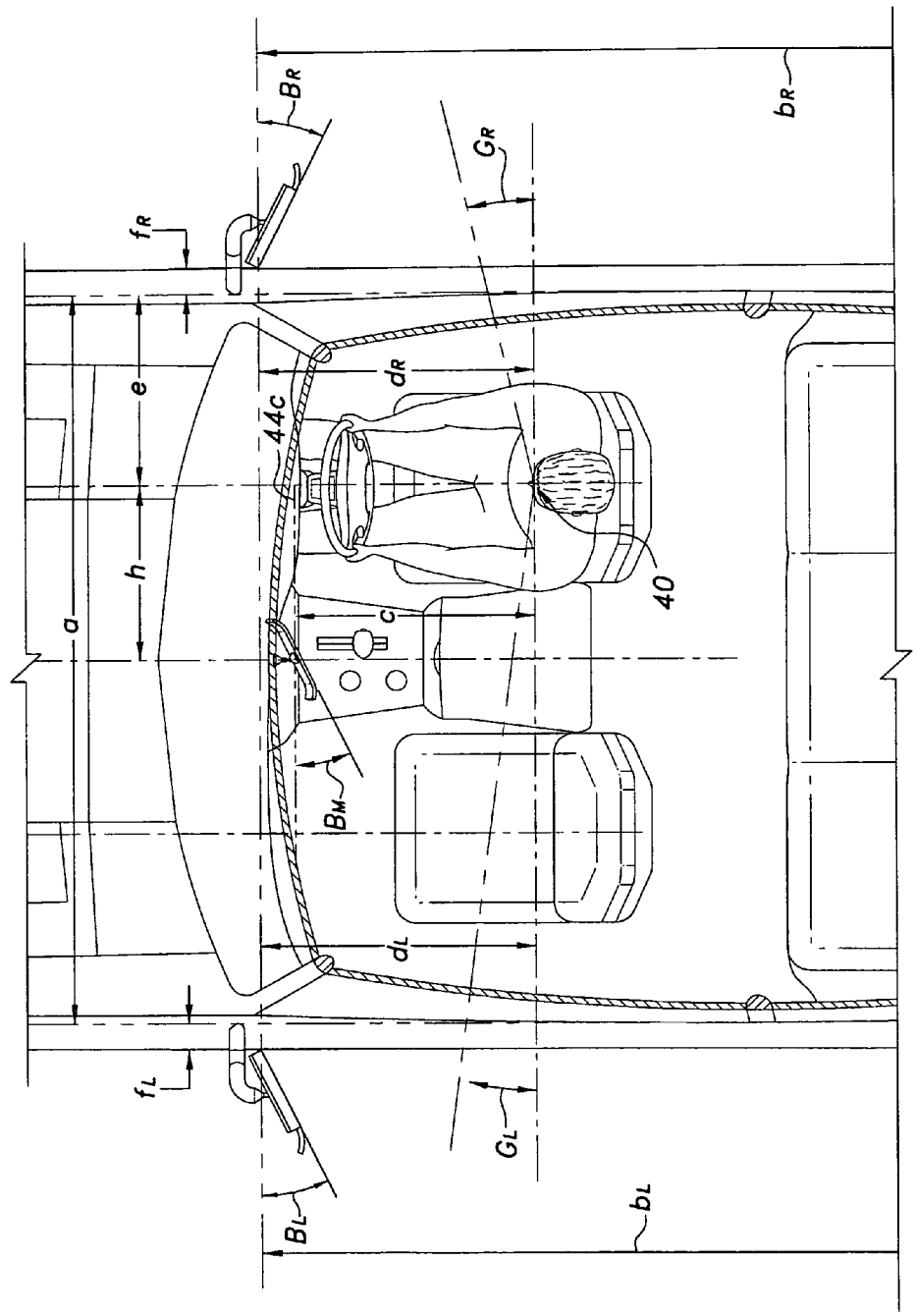
FIG. 1D is a detailed environmental top view of the curved rearview mirror system of FIG. 1C.

FIG. 1A depicts a left hand drive automobile 60 with the curved rearview mirrors 10, 20, and 30 of the curved mirror system. FIG. 1B depicts a close up of the driver 40 in relation to the rearview mirrors 10, 20, and 30. FIG. 1C depicts a right hand drive automobile 60R with the curved rearview mirrors 10, 20, and 30 of the curved mirror system. FIG. 1D depicts a close up of the driver 40 in right hand drive automobile 60R with the curved rearview mirrors 10, 20, and 30 of the curved mirror system.

Referring to FIGS. 1A, 1B, 1C, 1D, 3A and 3C, the central rearview mirror 10 is attached to a pivot 18 positioned at a point along a central line 42 of the automobile 60. The central line 42 is positioned near the center of the automobile 60, but can be positioned slightly to the right or to the left of the exact center of the automobile 60. The pivoted position of the central rearview mirror 10 is spaced a distance c away from the line demarking the plane of the driver's eyes $40_R$ and $40_L$ when the driver is facing forward and a distance h away from a line $40_h$ demarking the plane equidistant from the driver's left and right eyes. The central rearview mirror 10 is positioned at an angle $B_M$ from a line $44_C$ normal to the central line 42 of the automobile 60 and passing through the pivot point of the central mirror 10. Line $44_C$ and lines and vertical planes parallel thereto are referred to herein as lateral lines and planes or "the lateral".

Referring to FIGS. 1A-1B and 4A-4C, the left curved rearview mirror 20 is positioned to the left side of the automobile 60. The edge 84 of the planar section 22 that is not attached to a curved section is spaced a distance of $f_L$ away from the side $48_L$ of the automobile 60, a distance $d_L$ in front of the eyes of the driver $40_L$. The side $48_L$ of the automobile 60 is spaced a distance e from the center point of the driver's eyes $40_h$. The planar section is angled at an angle of $B_L$ away from a plane $44_L$ normal to the central line 42 of the automobile 60 and passing through the pivot point of the left side rearview mirror 20. A distance $b_L$ represents the distance from the straight edge 84 the planar section 22 of the left rearview mirror 20 to the back 46 of the automobile 60.

A reference point $50_L$ is to the left of the automobile 60. This reference point $50_L$ will be set by a designer and represent a position that the driver 40 desires to see via the left and center rearview mirrors 20 and 10. The reference point $50_L$ is a distance $g_L$ away from the side $48_L$ of the automobile 60. An angle $G_L$ or $G_{ML}$ represents the angle that a driver 40 must look away from the 90° left $40_L$ to see the reference point $50_L$.

Referring to FIGS. 1A-1B and 5A-5C, the right curved rearview mirror 30 is positioned to the right side $48_R$ of the automobile 60. The straight edge 94 of the planar section of the right rearview mirror 30 is spaced a distance of $f_R$ away from the side $48_R$ of the automobile 60, a distance $d_R$ in front of the eyes of the driver $40_R$. The planar section 32 is angled at an angle of $B_R$ away from a plane $44_R$ normal to central line 42 and passing through the pivot point of the right rearview mirror 30.

The side $48_R$ of the automobile 60 is spaced a distance a from the opposite side $48_L$. A distance $b_R$ represents the distance from the left edge 94 of the planar section 32 of the right rearview mirror 30 to the back 46 of the automobile 60.

A reference point $50_R$ is to the right of the automobile 60. This reference point $50_R$ will be set by a designer and represent a position that the driver 40 desires to see via the right and center rearview mirrors 30 and 10. The reference point $50_R$ is a distance $g_a$ away from the side $48_R$ of the automobile 60. An angle $G_R$ or $G_{MR}$ represents the angle that a driver 40 must look away from the 90° to the right $40_R$ to see the reference point $50_R$.

Figure 2:
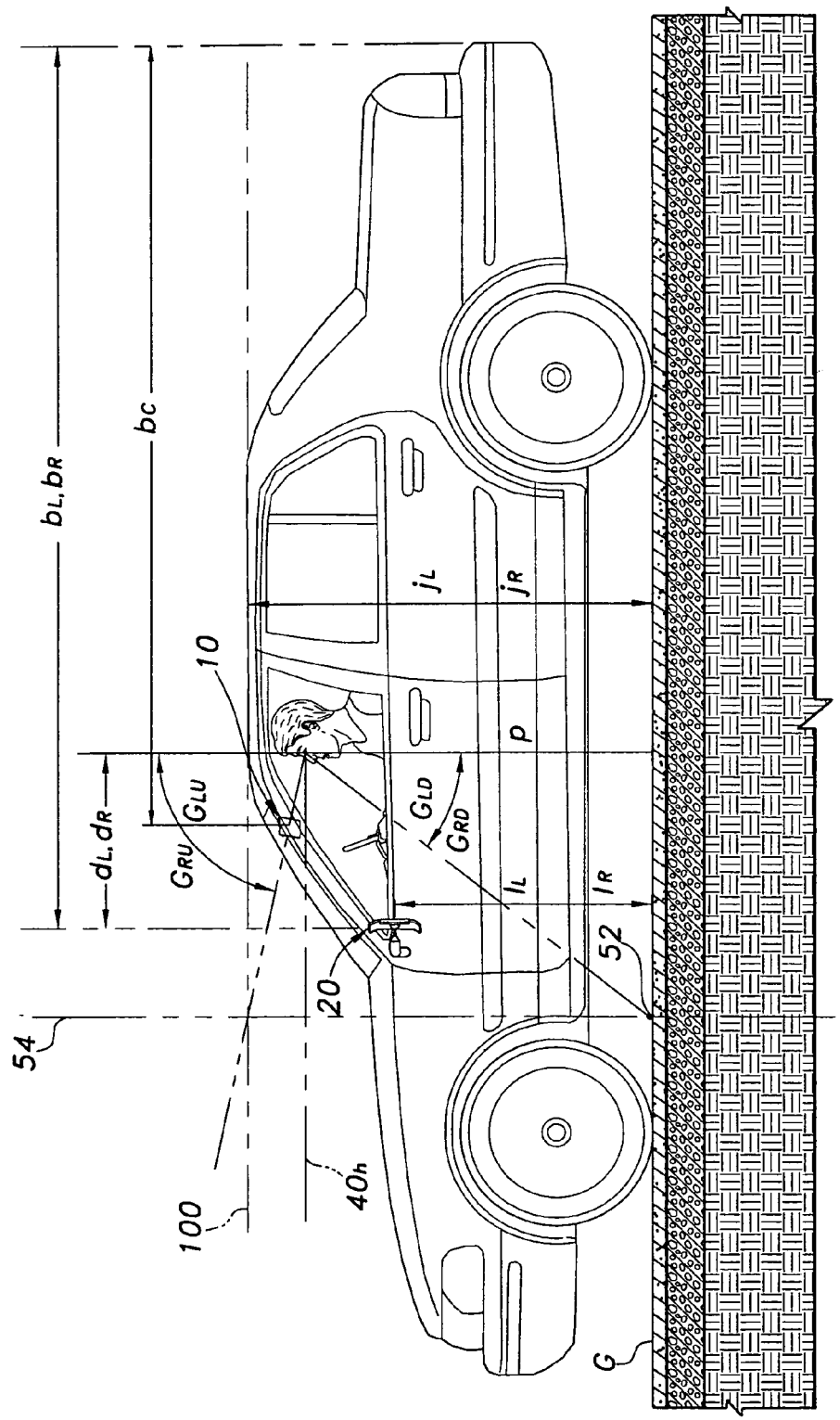
FIG. 2 is an environmental side view of the curved rearview mirror system of the present invention.

FIG. 2 depicts a side view of the automobile 60 with the curved rearview mirrors 10 and 20. The pivot position of the left rearview mirror 20 is a distance $l_L$ above the ground G. The pivot position of the right rearview mirror 30 is a distance $l_R$ above the ground G. The driver's eyes $40_h$ are a distance p above the ground G. The left side of the roof of the automobile 60 is a distance $j_L$ above the ground G. The right side of the roof of the automobile 60 is a distance $j_R$ above the ground G. A line 100 represents the level of the roof. The central rearview mirror 10 is a distance $b_C$ from the back of the car.

Either side of the automobile 60 has a second reference point 52 representing the furthest points forward along the ground that a driver 40 is able to see via the side rearview mirrors 20 and 30, respectively. The driver 40 must look at an angle $G_{LD}$ or $G_{RD}$ away from the vertical to see these reference points 52. A line 54 represents a vertical plane through the second reference point 52 and intersects with the plane of the roof 100. To see this intersection point, the driver 40 must look at an angle of $G_{LU}$ or $G_{RU}$ away from the vertical.

Figure 3A:
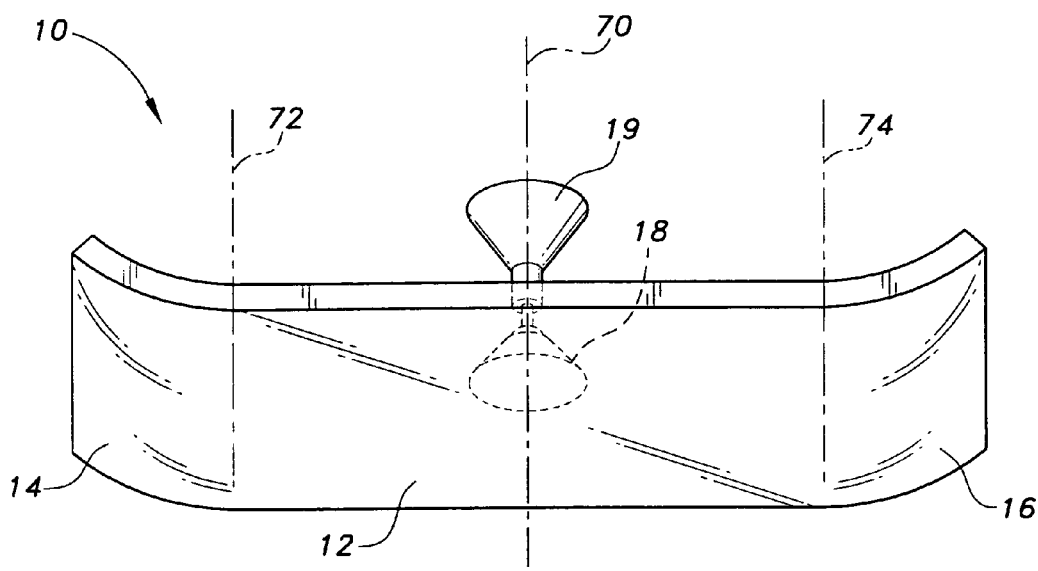
FIG. 3A is an environmental front perspective view of the central curved rearview mirror of the system of the present invention, showing the mirror attached to a windshield.
Figure 3B:
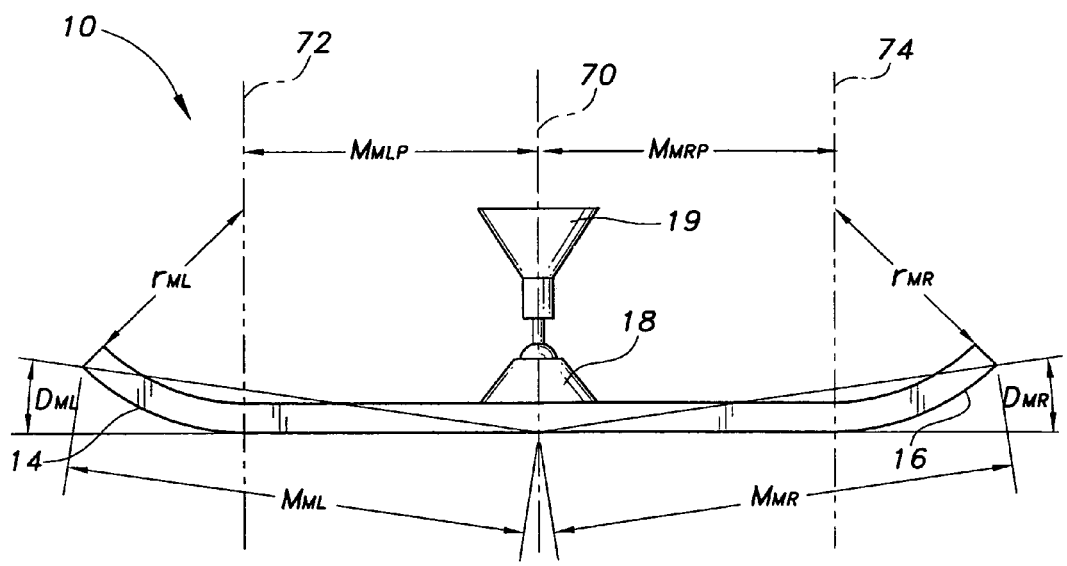
FIG. 3B is a top view of the central curved rearview mirror of the system of the present invention, showing the mirror attached to a windshield.

FIG. 3A shows a perspective view of the central rearview mirror 10. FIG. 3B shows a top view of the central rearview mirror 10. It includes a planar middle section 12, a convexly curved left section 14, and a convexly curved right section 16. The back of the mirror 10 is attached to a pivot 18 attached to the mount 19. The position on the mirror surface directly in front of pivot point 18 is demarcated with a line 70 described herein as the pivot position 70. The locations along the mirror where the mirror transitions from the planar section to the curved sections are demarcated with the lines 72 and 74. The mirror 10 has a length $M_{MLP}$ from the left edge 72 of the planar section to the pivot position 70. The mirror 10 has a length $M_{MRP}$ from the right edge 74 of the planar section to the pivot position 70. The left curved section 14 has a constant radius of curvature $r_{ML}$. The right curved section 16 has a constant radius of curvature $r_{MR}$. The mirror 10 has a length $M_{ML}$ from the far edge of the left curved section 14 to the pivot position 70. The mirror 10 has a length $M_{MR}$ from the far edge of the right curved section 16 to the pivot position 70. The left side of the central mirror 10 has an angle $D_{ML}$ between the plane of the planar section 12 and a plane including the far edge of the left curved section 14 and the pivot position 70. The right side of the central mirror 10 has an angle $D_{MR}$ between the plane of the planar section 12 and a plane including the far edge of the right curved section 16 and the pivot position 70.

The relative sizes, shapes, angles, and distances of the left side of the central rearview mirror as described above are governed by the following equations. It is noted that $I_{ML}$ does not denote any distance or shape of the mirror, but only represents a calculated value. $K_{ML}$ does not denote any distance or shape of the mirror, but represents the ratio of $M_{MLP}$ to $M_{ML}$.

$$I_{ML} = 90 - B_M - \frac{1}{2}\left[\arctan\frac{c + M_{ML} \cdot \sin(B_M + D_{ML})}{h - M_{ML} \cdot \cos(B_M + D_{ML})} + \arctan\frac{c + M_{ML} \cdot \sin(B_M + D_{ML}) - (g_L + e)\tan G_{ML}}{g_L + e + h - M_{ML} \cdot \cos(B_M + D_{ML})}\right]$$ (Equation 1)

$$I_{ML} = B_M + \frac{1}{2}\left[\arctan\frac{c - M_{ML} \cdot \sin(B_M - D_{ML})}{h + M_{ML} \cdot \cos(B_M - D_{ML})} - \arctan\frac{c - M_{ML} \cdot \sin(B_M - D_{ML}) - (g_R + a - e - h)\tan G_{ML}}{g_R + a - e - h - M_{ML} \cdot \cos(B_M + D_{ML})}\right]$$ (Equation 2)

$$K_{ML} = \frac{M_{MLP}}{M_{ML}} = \frac{\sin\left(\frac{I_{ML}}{2} - D_{ML}\right)}{\sin\left(\frac{I_{ML}}{2}\right)}$$ (Equation 3)

$$r_{ML} = \frac{M_{ML}\sqrt{(K_{ML})^2 + 1 - 2 \cdot K_{ML} \cdot \cos D_{ML}}}{2 \cdot \sin\left(\frac{I_{ML}}{2}\right)}$$ (Equation 4)

Optimally a designer of automobiles will set the $K_{ML}$ value, which represents the ratio of the distance of the left edge of the planar section 12 to the pivot position 70 to the distance from the far left edge of the left curved section 14 to the pivot position 70. After the $K_{ML}$ value is set, the other values are set or calculated according to a designer's desires. The $K_{ML}$ value is set between 1/10 and 9/10 depending on design choice. In the figures, the $K_{ML}$ value is set at 2/3.

The relative sizes, shapes, angles, and distances of the right side of the central rearview mirror 10 are governed by the following equations. It is noted that $I_{MR}$ does not denote any distance or shape of the mirror, but only represents a calculated value. $K_{MR}$ does not denote any distance or shape of the mirror, but represents the ratio of $M_{MRP}$ to $M_{MR}$.

$$I_{MR} = B_M + \frac{1}{2}\left[\arctan\frac{c - M_{MR} \cdot \sin(B_M - D_{MR})}{h + M_{MR} \cdot \cos(B_M - D_{MR})} - \arctan\frac{c - M_{MR} \cdot \sin(B_M - D_{MR}) - (g_R + a - e - h)\tan G_{MR}}{g_R + a - e - h - M_{MR} \cdot \cos(B_M - D_{MR})}\right]$$ (Equation 5)

$$I_{MR} = 90 - B_M - \frac{1}{2}\left[\arctan\frac{c + M_{MR} \cdot \sin(B_M + D_{MR})}{h - M_{MR} \cdot \cos(B_M + D_{MR})} + \arctan\frac{c + M_{MR} \cdot \sin(B_M + D_{MR}) - (g_R + e)\tan G_{MR}}{g_R + e + h - M_{MR} \cdot \cos(B_M + D_{MR})}\right]$$ (Equation 6)

$$K_{MR} = \frac{M_{MRP}}{M_{MR}} = \frac{\sin\left(\frac{I_{MR}}{2} - D_{MR}\right)}{\sin\left(\frac{I_{MR}}{2}\right)}$$ (Equation 7)

$$r_{MR} = \frac{M_{MR}\sqrt{K_{MR}^2 + 1 - 2 \cdot K_{MR} \cdot \cos D_{MR}}}{2 \cdot \sin\left(\frac{I_{MR}}{2}\right)}$$ (Equation 8)

Optimally a designer of automobiles will set the $K_{MR}$ value, which represents the ratio of the distance of the right edge 74 of the planar section 12 to the pivot position 70 to the distance from the far right edge of the right curved section 16 to pivot position 70. After the $K_{MR}$ value is set, the other values are set or calculated according to a designer's desires. The $K_{MR}$ value is set between 1/10 and 9/10 depending on design choice. In the figures, the $K_{MR}$ value is set at 2/3.

Figure 4A:
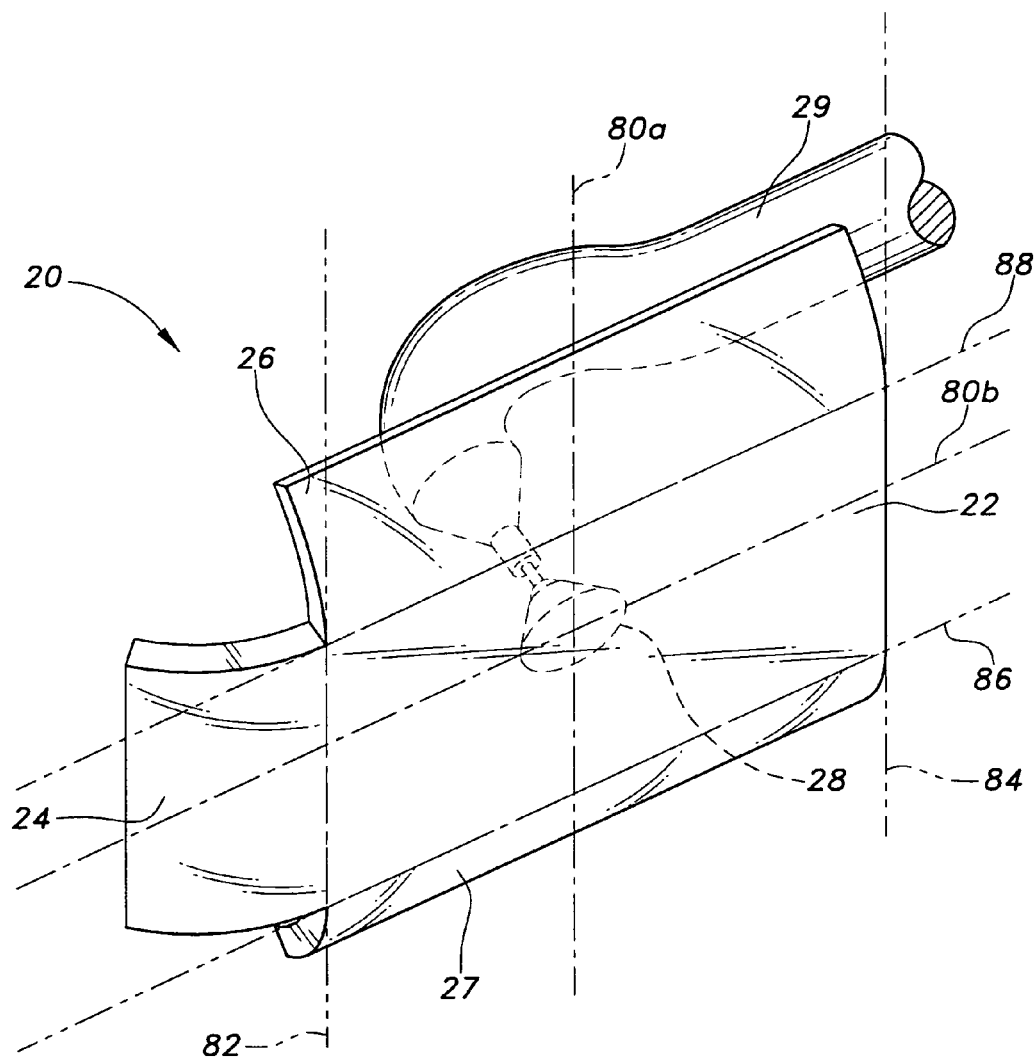
FIG. 4A is a front perspective view of a curved rearview mirror of the system of the present invention for mounting to the left side of a vehicle.

FIG. 4A depicts a perspective view of the left rearview mirror 20. The left rearview mirror includes a planar section 22, a side curved section 24 on the left side of the planar section 22, a top curved section 26, and a bottom curved section 27. The back of the mirror 20 is attached to a pivot 28 attached to the mount 29. The part of the mirror directly in front of pivot point 28 is demarcated with the lines 80a and 80b. The places along the mirror where the mirror transitions from the planar section to the curved sections are demarcated with the lines 82, 86, and 88. Line 84 demarks the right edge of the planar section 22.

Figure 4B:
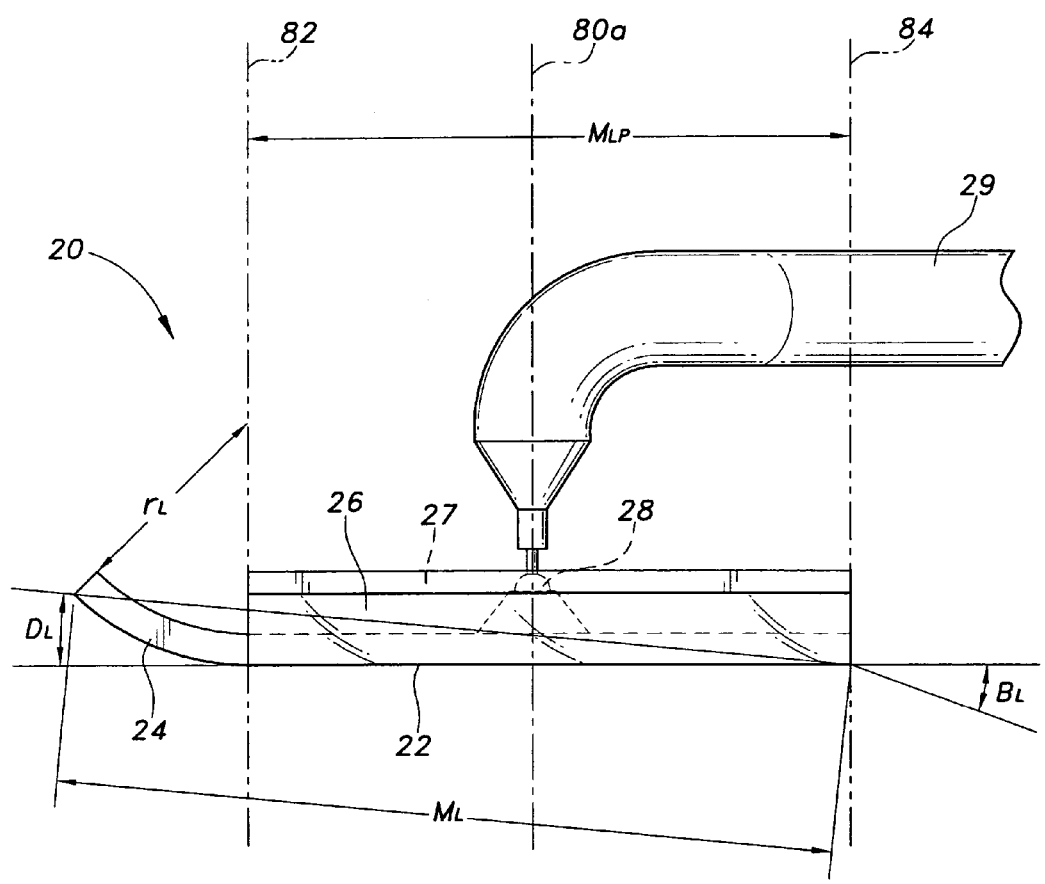
FIG. 4B is a top view of the left side mirror of FIG. 4A.

FIG. 4B depicts a top view of the left rearview mirror 20. The mirror 20 has a length $M_{LP}$ from the left edge 82 to the right edge 84 of the planar section 22. The left convexly curved section 24 has a constant radius of curvature $r_L$. The mirror 20 has a length $M_L$ from the far edge of the left curved section 24 to the right edge 84 of the planar section 22. The left mirror 20 has an angle $D_L$ between the plane of the planar section 22 and a plane including the far edge of the left curved section 24 and the right edge 84 of the planar section 22.

The relative sizes, shapes, angles, and distances of the left curved section of the left rearview mirror 20 are governed by the following equations. It is noted that $I_L$ does not denote any distance or shape of the mirror, but only represents a calculated value. $K_L$ does not denote any distance or shape of the mirror, but represents the ratio of $M_{LP}$ to $M_L$.

$$I_L = B_L + \frac{1}{2}\left[\arctan\frac{d_L - M_L \cdot \sin(B_L - D_L)}{e + f_L + M_L \cdot \cos(B_L - D_L)} - \arctan\frac{d_L - M_L \cdot \sin(B_L - D_L) - (g_L + e)\tan G_L}{g_L - f_L - M_L \cdot \cos(B_L - D_L)}\right]$$ (Equation 9)

$$I_L = B_L + \frac{1}{2}\left[\arctan\frac{d_L - M_L \cdot \sin(B_L - D_L)}{a - e + f_L + M_L \cdot \cos(B_L - D_L)} - \arctan\frac{d_L - M_L \cdot \sin(B_L - D_L) - (g_L + a - e)\tan G_L}{g_L - f_L - M_L \cdot \cos(B_L - D_L)}\right]$$ (Equation 10)

-continued $$K_L = \frac{M_{LP}}{M_L} = \frac{\sin\left(\frac{I_L}{2} - D_L\right)}{\sin\left(\frac{I_L}{2}\right)}$$ (Equation 11)

$$r_L = \frac{M_L\sqrt{K_L^2 + 1 - 2 \cdot K_L \cdot \cos D_L}}{2 \cdot \sin\left(\frac{I_L}{2}\right)}$$ (Equation 12)

Optimally a designer of automobiles will set the $K_L$ value, which represents the ratio of the distance $M_{LP}$ from the left edge 82 to the right edge 84 of the planar section 22 to the distance $M_L$ from the far left edge of the left curved section 24 to the right edge 84 of the planar section 22. After the $K_L$ value is set, the other values are set or calculated according to a designer's desires. The $K_L$ value is set between 1/10 and 9/10 depending on design choice. In the figures, the $K_L$ value is set at 2/3.

Figure 4C:
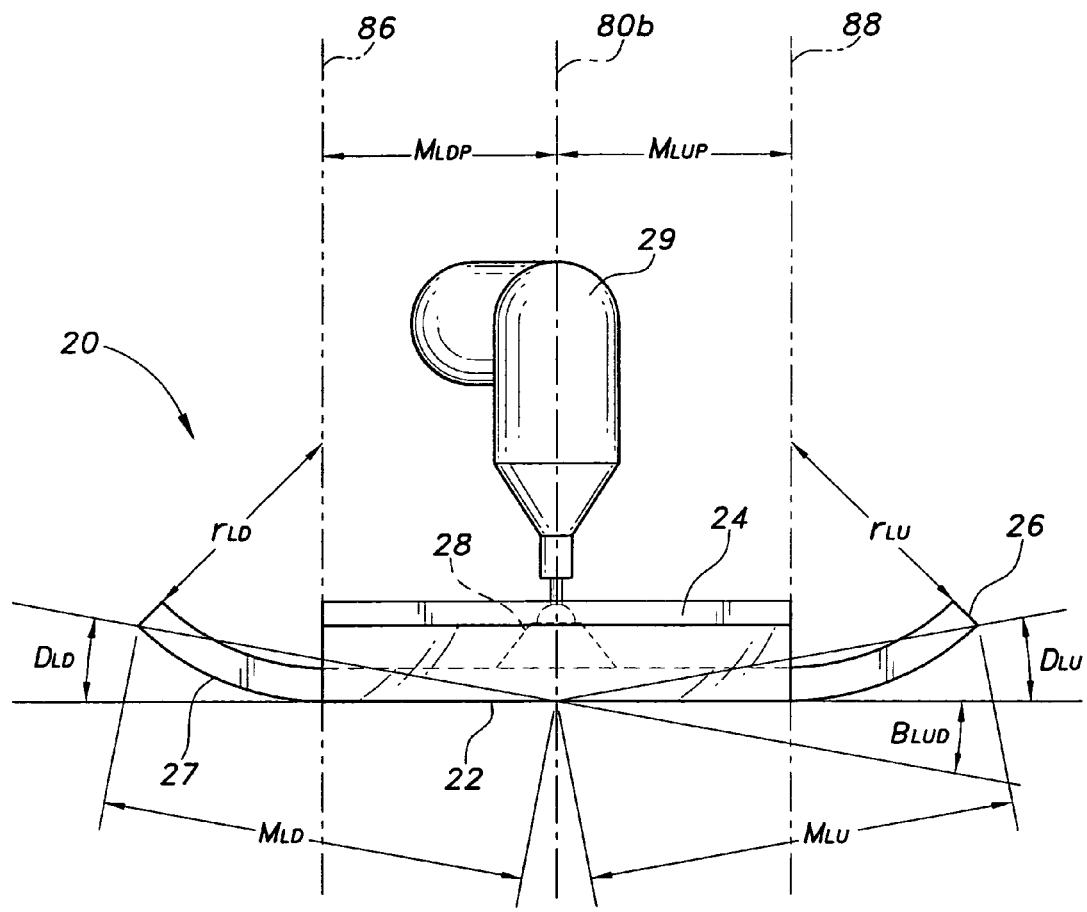
FIG. 4C is a side view of the left side mirror of FIG. 4A.

FIG. 4C depicts a side view of the left rearview mirror 20. The part of the mirror directly in front of pivot point 28 is demarcated with a line 80b. The places along the mirror where the mirror transitions from the planar section to the top and bottom curved sections are demarcated with the lines 88 and 86 respectively. The mirror 20 has a length $M_{LDP}$ from the bottom edge 86 of the planar section 22 to the pivot position 80b. The mirror 20 has a length $M_{LUP}$ from the top edge 88 of the planar section 22 to the pivot position 80b. The bottom curved section 27 has a constant radius of curvature $r_{LD}$. The top curved section 26 has a constant radius of curvature $r_{LU}$. The mirror 20 has a length $M_{LD}$ from the far edge of the bottom curved section 27 to the pivot position 80b. The mirror 20 has a length $M_{LU}$ from the far edge of the top curved section 26 to the pivot position 80b. The bottom side of the left mirror 20 has an angle $D_{LD}$ between the plane of the planar section 22 and a plane including the far edge of the bottom curved section 27 and the pivot position 80b. The top side of the left mirror 20 has an angle $D_{LU}$ between the plane of the planar section 22 and a plane including the far edge of the top curved section 26 and the pivot position 80b. The angle $B_{LUD}$ is the angle of downward tilt of the planar section 22 relative to a vertical plane normal to the centerline of the vehicle.

The relative sizes, shapes, angles, and distances of the bottom side of the left rearview mirror 20 are governed by the following equations. It is noted that $I_{LD}$ does not denote any distance or shape of the mirror, but only represents a calculated value. $K_{LD}$ does not denote any distance or shape of the mirror, but represents the ratio of $M_{LDP}$ to $M_{LP}$.

$$I_{LD} = B_{LUD} + \frac{1}{2}\left[\arctan\frac{d_L - M_{LD} \cdot \sin(B_{LUD} - D_{LD})}{p - l_L + M_{LD} \cdot \cos(B_{LUD} - D_{LD})} - \arctan\frac{d_L - M_{LD} \cdot \sin(B_{LUD} - D_{LD}) - p \cdot \tan G_{LD}}{l_L - M_{LD} \cdot \cos(B_{LUD} - D_{LD})}\right]$$ (Equation 13)

$$K_{LD} = \frac{M_{LDP}}{M_{LD}} = \frac{\sin\left(\frac{I_{LD}}{2} - D_{LD}\right)}{\sin\left(\frac{I_{LD}}{2}\right)}$$ (Equation 14)

$$r_{LD} = \frac{M_{LD}\sqrt{K_{LD}^2 + 1 - 2 \cdot K_{LD} \cdot \cos D_{LD}}}{2 \cdot \sin\left(\frac{I_{LD}}{2}\right)}$$ (Equation 15)

Optimally a designer of automobiles will set the $K_{LD}$ value, which represents the ratio of the distance $M_{LDP}$ of the bottom edge 86 of the planar section 22 to the pivot position 80b to the distance $M_{LD}$ from the far bottom edge of the bottom curved section 27 to pivot position 80b. After the $K_{LD}$ value is set, the other values are set or calculated according to a designer's desires. The $K_{LD}$ value is set between 1/10 and 9/10 depending on design choice. In the figures, the $K_{LD}$ value is set at 2/3.

The top side of the left rearview mirror 20 is governed by the following equations. It is noted that $I_{LU}$ does not denote any distance or shape of the mirror, but only represents a calculated value. $K_{LU}$ does not denote any distance or shape of the mirror, but represents the ratio of $M_{LUP}$ to $M_{LU}$.

$$I_{LU} = 90 - B_{LUD} - \frac{1}{2}\left[\arctan\frac{d_L + M_{LU} \cdot \sin(B_{LUD} + D_{LU})}{p - l_L - M_{LU} \cdot \cos(B_{LUD} + D_{LU})} + \arctan\frac{d_L + M_{LU} \cdot \sin(B_{LUD} + D_{LU}) - (j_L - p)\tan G_{LU}}{j_L - l_L - M_{LU} \cdot \cos(B_{LUD} + D_{LU})}\right]$$ (Equation 16)

$$K_{LU} = \frac{M_{LUP}}{M_{LU}} = \frac{\sin\left(\frac{I_{LU}}{2} - D_{LU}\right)}{\sin\left(\frac{I_{LU}}{2}\right)}$$ (Equation 17)

$$r_{LU} = \frac{M_{LU}\sqrt{K_{LU}^2 + 1 - 2 \cdot K_{LU} \cdot \cos D_{LU}}}{2 \cdot \sin\left(\frac{I_{LU}}{2}\right)}$$ (Equation 18)

Optimally a designer of automobiles will set the $K_{LU}$ value, which represents the ratio of the distance $M_{LUP}$ of the top edge 88 of the planar section 22 to the pivot position 80b to the distance $M_{LU}$ from the far top edge of the top curved section 26 to the pivot position 80b. After the $K_{LU}$ value is set, the other values are set or calculated according to a designer's desires. The $K_{LU}$ value is set between 1/10 and 9/10 depending on design choice. In the figures, the $K_{LU}$ value is set at 2/3.

Figure 5A:
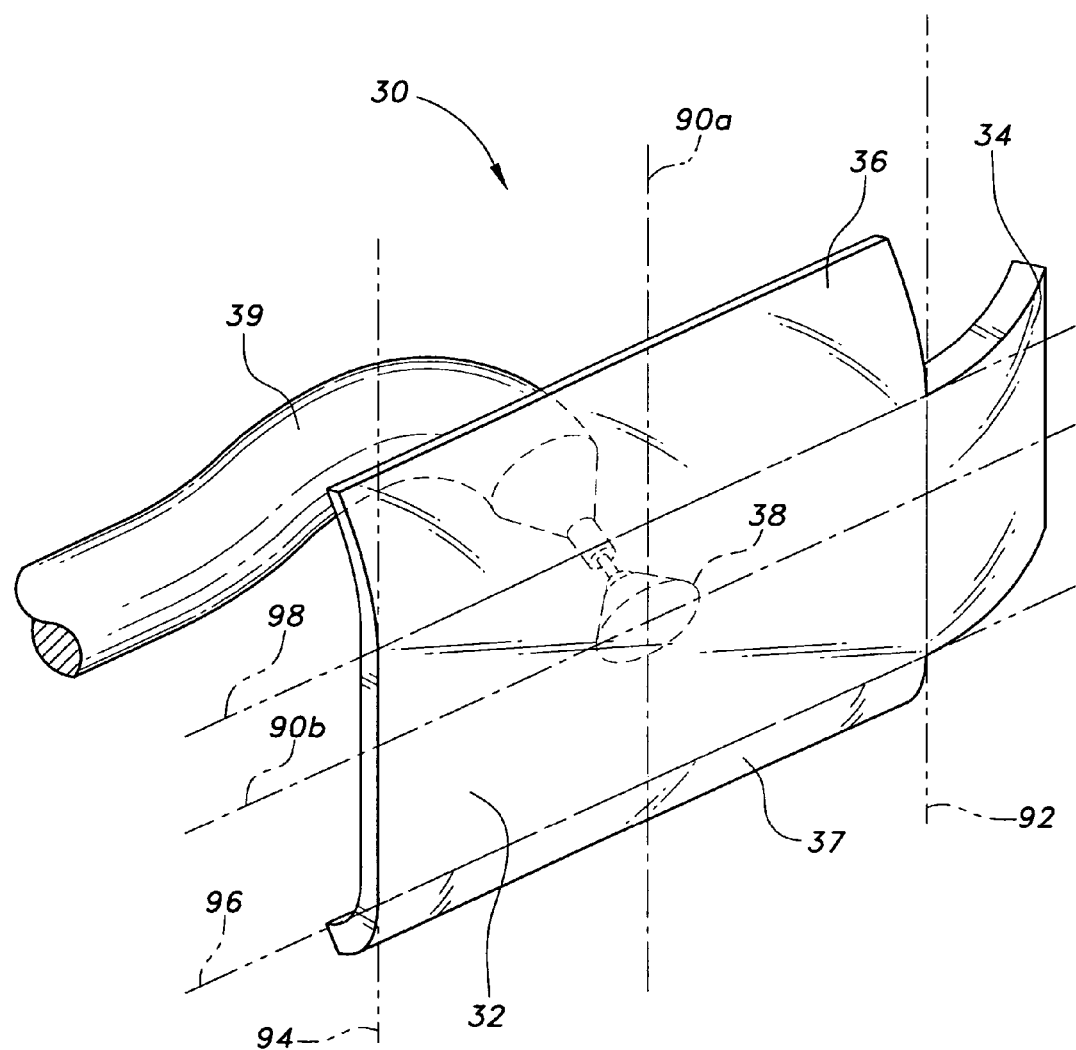
FIG. 5A is a front perspective view of a curved rearview mirror of the system of the present invention for mounting to the right side of a vehicle.

FIG. 5A depicts a perspective view of the right rearview mirror 30. The right rearview mirror includes a planar section 32, a side curved section 34 on the right side of the planar section 32, a top curved section 36, and a bottom curved section 37. The back of the mirror 30 is attached to a pivot 38 attached to the mount 39. The part of the mirror directly in front of pivot point 38 is demarcated with a line 90. The places along the mirror 30 where the mirror transitions from the planar section to the curved sections are demarcated with the lines 92, 96, and 98. Line 94 demarks the left edge of the planar section 32.

Figure 5B:
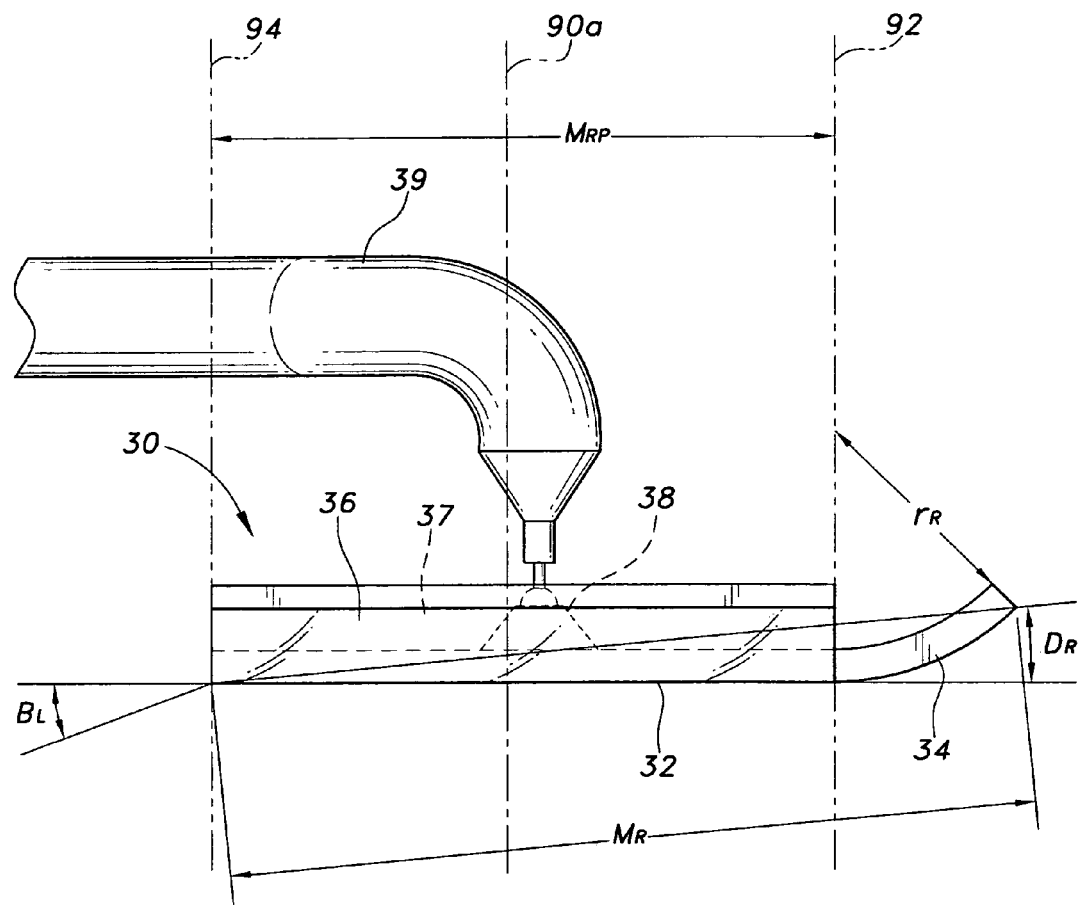
FIG. 5B is a top view of the right side mirror of FIG. 5A.

FIG. 5B depicts a top view of the right rearview mirror 30. The mirror 30 has a length $M_{RP}$ from the right edge 92 of the planar section 32 to the left edge 94 of the planar section 32. The right curved section 34 has a constant radius of curvature $r_R$. The mirror 30 has a length $M_R$ from the far edge of the right curved section 34 to the left edge 94 of the planar section 32. The mirror 30 has an angle $D_R$ between the plane of the planar section 32 and a plane including the far edge of the right curved section 34 and the left edge 94 of the planar section 32.

The relative sizes, shapes, angles, and distances of the left curved section of the left rearview mirror 30 as described above are governed by the following equations. It is noted that $I_R$ does not denote any distance or shape of the mirror, but only represents a calculated value. $K_R$ does not denote any distance or shape of the mirror, but represents the ratio of $M_{RP}$ to $M_R$.

$$I_R = B_R + \frac{1}{2}\left[\arctan\frac{d_R - M_R \cdot \sin(B_R - D_R)}{a - e + f_R + M_R \cdot \cos(B_R - D_R)} - \arctan\frac{d_R - M_R \cdot \sin(B_R - D_R) - (g_R + a - e)\tan G_R}{g_R - f_R - M_R \cdot \cos(B_R - D_R)}\right] \quad \text{(Equation 19)}$$

$$I_R = B_R + \frac{1}{2}\left[\arctan\frac{d_R - M_R \cdot \sin(B_R - D_R)}{e + f_R + M_R \cdot \cos(B_R - D_R)} - \arctan\frac{d_R - M_R \cdot \sin(B_R - D_R) - (g_R + e)\tan G_R}{g_R - f_R - M_R \cdot \cos(B_R - D_R)}\right] \quad \text{(Equation 20)}$$

$$K_R = \frac{M_{RP}}{M_R} = \frac{\sin\left(\frac{I_R}{2} - D_R\right)}{\sin\left(\frac{I_R}{2}\right)} \quad \text{(Equation 21)}$$

$$r_R = \frac{M_R\sqrt{K_R^2 + 1 - 2 \cdot K_R \cdot \cos D_R}}{2 \cdot \sin\left(\frac{I_R}{2}\right)} \quad \text{(Equation 22)}$$

Optimally a designer of automobiles will set the $K_R$ value, which represents the ratio of the distance $M_{RP}$ from the right edge 92 to the left edge 94 of the planar section 32 to the distance $M_R$ from the far right edge of the right curved section 34 to the left edge 94 of the planar section 32. After the $K_R$ value is set, the other values are set or calculated according to a designer's desires. The $K_R$ value is set between ⅒ and ⁹⁄₁₀ depending on design choice. In the figures, the $K_R$ value is set at ⅔.

Figure 5C:
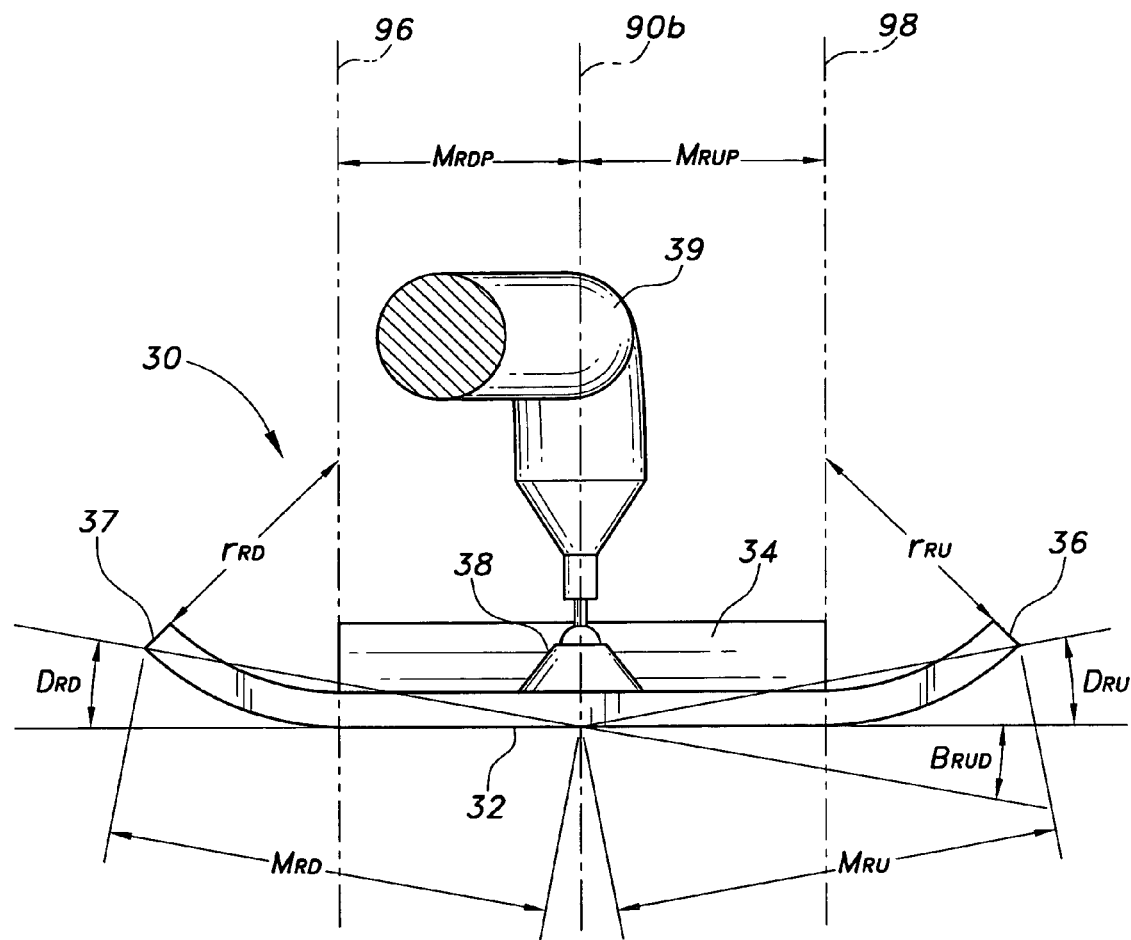
FIG. 5C is a side view of the right side mirror of FIG. 5A.

FIG. 5C depicts a side view of the right rearview mirror 30. The part of the mirror directly in front of pivot point 38 is demarcated with a line 90b. The places along the mirror where the mirror transitions from the planar section 32 to the top and bottom curved sections 36 and 37 are demarcated with the lines 98 and 96 respectively. The mirror 30 has a length $M_{RDP}$ from the bottom edge 96 of the planar section 32 to the pivot position 90b. The mirror 30 has a length $M_{RUP}$ from the top edge 98 of the planar section 32 to the pivot position 90b. The bottom curved section 37 has a constant radius of curvature $r_{RD}$. The top curved section 36 has a constant radius of curvature $r_{RU}$. The mirror 30 has a length $M_{RD}$ from the far edge of the bottom curved section 37 to the pivot position 90b. The mirror 30 has a length $M_{RU}$ from the far edge of the top curved section 36 to the pivot position 90b. The bottom side of the right mirror 30 has an angle $D_{RD}$ between the plane of the planar section 32 and a plane including the far edge of the bottom curved section 37 and the pivot position 90b. The top side of the right mirror 30 has an angle $D_{RU}$ between the plane of the planar section 32 and a plane including the far edge of the top curved section 36 and the pivot position 90b.

The relative sizes, shapes, angles, and distances of the bottom side of the right rearview mirror 30 are governed by the following equations. It is noted that $I_{RD}$ does not denote any distance or shape of the mirror, but only represents a calculated value. $K_{RD}$ does not denote any distance or shape of the mirror, but represents the ratio of $M_{RDP}$ to $M_{RD}$.

$$I_{RD} = B_{RUD} + \frac{1}{2}\left[\arctan\frac{d_R - M_{RD} \cdot \sin(B_{RUD} - D_{RD})}{p - l_R + M_{RD} \cdot \cos(B_{RUD} - D_{RD})} - \arctan\frac{d_R - M_{RD} \cdot \sin(B_{RUD} - D_{RD}) - p \cdot \tan G_{RD}}{l_R - M_{RD} \cdot \cos(B_{RUD} - D_{RD})}\right] \quad \text{(Equation 23)}$$

$$K_{RD} = \frac{M_{RDP}}{M_{RD}} = \frac{\sin\left(\frac{I_{RD}}{2} - D_{RD}\right)}{\sin\left(\frac{I_{RD}}{2}\right)} \quad \text{(Equation 24)}$$

$$r_{RD} = \frac{M_{RD}\sqrt{K_{RD}^2 + 1 - 2 \cdot K_{RD} \cdot \cos D_{RD}}}{2 \cdot \sin\left(\frac{I_{RD}}{2}\right)} \quad \text{(Equation 25)}$$

Optimally a designer of automobiles will set the $K_{RD}$ value, which represents the ratio of the distance $M_{RDP}$ of the bottom edge 96 of the planar section 32 to the pivot position 90b to the distance $M_{RD}$ from the far bottom edge of the bottom curved section 37 to pivot position 90b. After the $K_{RD}$ value is set, the other values are set or calculated according to a designer's desires. The $K_{RD}$ value is set between ⅒ and ⁹⁄₁₀ depending on design choice. In the figures, the $K_{RD}$ value is set at ⅔.

The top side of the right rearview mirror 30 is governed by the following equations. It is noted that $I_{RU}$ does not denote any distance or shape of the mirror, but only represents a calculated value. $K_{RU}$ does not denote any distance or shape of the mirror, but represents the ratio of $M_{RUP}$ to $M_{RU}$.

$$I_{RU} = 90 - B_{RUD} - \frac{1}{2}\left[\arctan\frac{d_R + M_{RU} \cdot \sin(B_{RUD} + D_{RU})}{p - l_R - M_{RU} \cdot \cos(B_{RUD} + D_{RU})} + \arctan\frac{d_R + M_{RU} \cdot \sin(B_{RUD} + D_{RU}) - (j_R - p)\tan G_{RU}}{j_R - l_R - M_{RU} \cdot \cos(B_{RUD} + D_{RU})}\right] \quad \text{(Equation 26)}$$

$$K_{RU} = \frac{M_{RUP}}{M_{RU}} = \frac{\sin\left(\frac{I_{RU}}{2} - D_{RU}\right)}{\sin\left(\frac{I_{RU}}{2}\right)} \quad \text{(Equation 27)}$$

$$r_{RU} = \frac{M_{RU}\sqrt{K_{RU}^2 + 1 - 2 \cdot K_{RU} \cdot \cos D_{RU}}}{2 \cdot \sin\left(\frac{I_{RU}}{2}\right)} \quad \text{(Equation 28)}$$

Optimally a designer of automobiles will set the $K_{RU}$ value, which represents the ratio of the distance $M_{RUP}$ of the top edge 98 of the planar section 32 to the pivot position 90b to the distance $M_{RU}$ from the far top edge of the top curved section 36 to the pivot position 90b. After the $K_{RU}$ value is set, the other values are set or calculated according to a designer's desires. The $K_{RU}$ value is set between ⅒ and ⁹⁄₁₀ depending on design choice. In the figures, the $K_{RU}$ value is set at ⅔.

Table of symbols:

c=the forward distance between the driver's eyes and the pivot point of the central mirror.

h=the lateral distance between the driver's ayes and the pivot point of the central mirror.

$B_M$=the angle of the flat face of the central mirror relative to lateral.

a=the lateral distance between the left side and the right side of the vehicle.

$f_L$=the lateral distance between the left side of the vehicle and the inner edge of the left mirror.

$d_L$=the forward distance from the driver's eyes to the inner edge of the left mirror.

$e$=the lateral distance between the driver's eyes and the left side of the vehicle.

$B_L$=the angle between the face of the left mirror and lateral.

$b_L$=the forward distance between the rear of the vehicle and the inner edge of the left mirror.

$g_L$=the lateral distance from the left side of the vehicle and the first left reference point.

$(G_L, G_{ML})$=the angle between lateral and the first reference point.

$f_R$=the lateral distance between the right side mirror inner edge and the right side of the vehicle.

$d_R$=the forward distance from the driver's eyes to the inner edge of the right side mirror.

$B_R$=the angle between the face of the right side mirror and lateral.

$b_R$=the forward distance from the rear of the vehicle to the inner edge of the right side mirror.

$g_R$=the lateral distance between the right side of the vehicle and the first right reference point.

$(G_R, G_{MR})$=the angle between lateral and the first right reference point.

$l_L$=the vertical distance between ground and the pivot point of the left side mirror.

$l_R$=the vertical distance between the ground and the pivot point of the right side mirror.

$p$=the vertical distance of the driver's eyes above the ground.

$j_L$=the vertical distance between the ground and the left side of the vehicle roof.

$j_R$=the vertical distance between the ground and the right side of the vehicle roof.

$b_c$=the forward distance between the rear of the vehicle and the central rearview mirror.

$G_{LD}$=the forward angle from vertical of the second left reference point.

$G_{RD}$=the forward angle from vertical of the second right reference point.

$(G_{LU}, G_{RU})$=the angle of the driver's line of sight relative to vertical when directed to any of a locus of points representing the intersection of a vertical plane extending between the second left and the second right reference points and a horizontal plane at vehicle roof level.

$M_{MLP}$=the length from the left planar edge to the pivot position of the central mirror.

$M_{MRP}$=the length from the right planar edge to the pivot position of the central mirror.

$r_{ML}$=the radius of the left curved section of the central mirror.

$r_{MR}$=the radius of the right curved section of the central mirror.

$M_{ML}$=the length from the far edge of the left curved section to the pivot position of the central mirror.

$M_{MR}$=the length from the far edge of the right curved section to the pivot position of the central mirror.

$D_{ML}$=the angle between the planar section and a plane including the far edge of the left curved section and the pivot point of the central mirror.

$D_{MR}$=the angle between the planar section and a plane including the far edge of the right curved section and the pivot point of the central mirror.

$M_{LP}$=the length from the left edge of the flat portion to the inner right edge of the left mirror.

$r_L$=the constant radius of the left curved section of the left mirror.

$M_L$=the length from the far left edge of the curved section to the right inner edge of the left mirror.

$D_L$=the angle between the planar section and a plane including the far edge of the left curved section and the inner right edge of the left mirror.

$M_{LDP}$=the length from the bottom edge of the planar section to the pivot section of the left mirror.

$M_{LUP}$=the length from the top edge of the planar section to the pivot position of the left mirror.

$r_{LD}$=the constant radius of bottom curved section of the left mirror.

$r_{LU}$=the constant radius of the top curved section of the left mirror.

$M_{LD}$=the length from the far edge of the bottom curved section to the pivot position of the left mirror.

$M_{LU}$=the length from the far edge of the top curved section to the pivot position of the left mirror.

$D_{LD}$=the angle between the planar section and a plane including the far edge of the bottom curved section and the pivot position of the left mirror.

$D_{LU}$=the angle between the planar section and a plane including the far edge of the top curved section and the pivot position of the left mirror.

$B_{LUD}$=the angle of upward tilt of the planar section relative to a vertical plane normal to the centerline of the vehicle.

$M_{RP}$=the length from the right edge of the planar section to the inner left edge of the planar section of the right mirror.

$r_R$=the constant radius of the right curved section of the right mirror.

$M_R$=the length from the far edge of the right curved section to the inner left edge of the right mirror.

$D_R$=the angle between the planar section and a plane including the far edge of the right curved section and the inner left edge of the planar section of the right mirror.

$M_{RDP}$=the length from the bottom edge of the planar section to the pivot position of the right mirror.

$M_{RUP}$=the length from the top edge of the planar section to the pivot position of the right mirror.

$r_{RD}$=the constant radius of the bottom curved section of the right mirror.

$r_{RU}$=the constant radius of the top curved section of the right mirror.

$M_{RD}$=the length from the far edge of the bottom curved section to the pivot position of the right mirror.

$M_{RU}$=the length from the far edge of the top curved section to the pivot position of the right mirror.

$D_{RD}$=the angle between the planar section and a plane including the far edge of the bottom curved section and the pivot position of the right mirror.

$D_{RU}$=the angle between the planar section and a plane including the far edge of the top of the curved section and the pivot position of the right mirror.

$B_{RUD}$=the angle of upward tilt of the planar section relative to a vertical plane normal to the centerline of the vehicle;

It is to be understood that the present invention is not limited to the embodiments described above, but encompasses any and all embodiments within the scope of the following claims.

I claim:

1. A curved central rearview mirror for a vehicle, comprising:
   a body having a reflective front surface and a back surface, said front surface having:

a central planar section;
a left section having a constant radius of curvature and extending from a left far edge to said central planar section;
a right section having a constant radius of curvature and extending from a right far edge to said central planar section;
a pivot having a central axis and connected to the back of said body behind said central planar section, a point on the front surface of the mirror exactly opposite to said pivot along said central axis defining a pivot position, wherein said pivot position is located along about the centerline of the vehicle, and the radius of curvature $r_{ML}$ of said left curved section is determined by Equations 1, 3 and 4 when the vehicle is a left hand drive vehicle, and by Equations 2, 3 and 4 when the vehicle is a right hand drive vehicle:

$$I_{ML} = 90 - B_M - \frac{1}{2}\left[\arctan\frac{c + M_{ML}\cdot\sin(B_M + D_{ML})}{h - M_{ML}\cdot\cos(B_M + D_{ML})} + \right.$$
$$\left.\arctan\frac{c + M_{ML}\cdot\sin(B_M + D_{ML}) - (g_L + e)\tan G_{ML}}{g_L + e + h - M_{ML}\cdot\cos(B_M + D_{ML})}\right] \quad \text{(Equation 1)}$$

$$I_{ML} = B_M + \frac{1}{2}\left[\arctan\frac{c - M_{ML}\cdot\sin(B_M - D_{ML})}{h + M_{ML}\cdot\cos(B_M - D_{ML})} - \right.$$
$$\left.\arctan\frac{c - M_{ML}\cdot\sin(B_M - D_{ML}) - (g_R + a - e - h)\tan G_{ML}}{g_R + a - e - h - M_{ML}\cdot\cos(B_M + D_{ML})}\right] \quad \text{(Equation 2)}$$

$$K_{ML} = \frac{M_{MLP}}{M_{ML}} = \frac{\sin\left(\frac{I_{ML}}{2} - D_{ML}\right)}{\sin\left(\frac{I_{ML}}{2}\right)} \quad \text{(Equation 3)}$$

$$r_{ML} = \frac{M_{ML}\sqrt{(K_{ML})^2 + 1 - 2\cdot K_{ML}\cdot\cos D_{ML}}}{2\cdot\sin\left(\frac{I_{ML}}{2}\right)} \quad \text{(Equation 4)}$$

wherein $I_{ML}$ is an intermediate calculated value; $B_M$ is the angle of the flat face of the central mirror relative to lateral; c is the forward distance between the driver's eyes and the pivot point of the central mirror; $M_{MLP}$ is the mirror length from the left edge of the planar section to the pivot position; $M_{ML}$ is the length from the far edge of the left curved section to the pivot position of the central mirror; $D_{ML}$ is the angle between the planar section and a plane including the far edge of the left curved section and the pivot point of the central mirror; h is the lateral distance between the driver's eyes and the pivot point of the central mirror; $g_L$ is the lateral distance from the left side of the vehicle to a first selected left reference point; e is the lateral distance between the driver's eyes and the left side of the vehicle; $G_{ML}$ is the angle between lateral and said first left reference point; said first left reference point being a selected point to the left of the vehicle which the driver wishes to see with the central mirror;
wherein the ratio $K_{ML}$ of the distance from the left side of the planar section to said pivot position to the distance from said left far edge to said pivot position is between about 1/10 and 9/10; and
wherein the ratio $K_{MR}$ of the distance from the right side of the planar section to said pivot position to the distance from said right far edge to said pivot position is between about 1/10 and 9/10.

2. A curved left rearview mirror for a vehicle, comprising:
a body having a reflective front surface and a back surface, said front surface having:
a central planar section;
a left section having a constant radius of curvature and extending from a left far edge to said central planar section;
an upper section having a constant radius of curvature and extending from an upper far edge to said central planar section;
a bottom section having a constant radius of curvature and extending from the bottom far edge to said central planar section;
a pivot having a central axis and connected to the back of said body behind said central planar section, a point on the front surface of the mirror exactly opposite to said pivot along said central axis defining a pivot position;
wherein the ratio $K_L$ of the distance $M_{LP}$ from the left edge of the planar section to the right edge of the planar section to the distance $M_L$ from the far left edge of the left curved section to the right edge of the planar section is between about 1/10 and 9/10;
wherein the ratio $K_{LD}$, of the distance $M_{LDP}$ from the bottom edge of the planar section to said pivot position to the distance $M_{LD}$ from the far edge of the lower curved section to said pivot position is between about 1/10 and about 9/10; and
wherein the ratio $K_{LU}$ of the distance $M_{LUP}$ from the top edge of the planar section to said pivot position to the distance $M_{LU}$ from the far top edge of the top curved section to said pivot position is between about 1/10 and about 9/10.

3. The curved left rearview mirror of claim 2, wherein said pivot position is located along the left side of the vehicle, the vehicle being a left hand drive vehicle, and the radius of curvature $r_L$ of said left curved section is determined by the equations:

$$I_L = B_L + \frac{1}{2}\left[\arctan\frac{d_L - M_L\cdot\sin(B_L - D_L)}{e + f_L + M_L\cdot\cos(B_L - D_L)} - \right.$$
$$\left.\arctan\frac{d_L - M_L\cdot\sin(B_L - D_L) - (g_L + e)\tan G_L}{g_L - f_L - M_L\cdot\cos(B_L - D_L)}\right] \quad \text{(Equation 9)}$$

$$K_L = \frac{M_{LP}}{M_L} = \frac{\sin\left(\frac{I_L}{2} - D_L\right)}{\sin\left(\frac{I_L}{2}\right)} \quad \text{(Equation 11)}$$

$$r_L = \frac{M_L\sqrt{K_L^2 + 1 - 2\cdot K_L\cdot\cos D_L}}{2\cdot\sin\left(\frac{I_L}{2}\right)} \quad \text{(Equation 12)}$$

wherein $I_L$ is an intermediate calculated value; $B_L$ is the angle between the face of the left mirror and lateral; $d_L$ is the forward distance from the driver's eyes to the inner edge of the left mirror; $M_{LP}$ is the length from the left edge to the right edge of the planar section of the left mirror; $M_L$ is the length from the far left edge of the curved section to the right inner edge of the left mirror; $D_L$ is the angle between the planar section and a plane including the far edge of the left curved section and the inner right edge of the left mirror; e is the lateral distance between the driver's eyes and the left side of the vehicle; $f_L$ is the lateral distance between the left side of the vehicle and the inner edge of the left mirror; $g_L$ is the lateral distance from the left side of the vehicle and a selected first left reference point; and $G_L$ is the angle between lateral and said first left reference point.

4. The curved left rearview mirror of claim 2, wherein the radius of curvature $r_{LD}$ of said lower curved section is determined by the equations:

$$I_{LD} = B_{LUD} + \frac{1}{2}\left[\arctan\frac{d_L - M_{LD} \cdot \sin(B_{LUD} - D_{LD})}{p - l_L + M_{LD} \cdot \cos(B_{LUD} - D_{LD})} - \arctan\frac{d_L - M_{LD} \cdot \sin(B_{LUD} - D_{LD}) - p \cdot \tan G_{LD}}{l_L - M_{LD} \cdot \cos(B_{LUD} - D_{LD})}\right]$$ (Equation 13)

$$K_{LD} = \frac{M_{LDP}}{M_{LD}} = \frac{\sin\left(\frac{I_{LD}}{2} - D_{LD}\right)}{\sin\left(\frac{I_{LD}}{2}\right)}$$ (Equation 14)

$$r_{LD} = \frac{M_{LD}\sqrt{K_{LD}^2 + 1 - 2 \cdot K_{LD} \cdot \cos D_{LD}}}{2 \cdot \sin\left(\frac{I_{LD}}{2}\right)}$$ (Equation 15)

wherein $I_{LD}$, is an intermediate calculated value; $D_{LD}$ is the angle between the planar section and a plane including the far edge of the bottom curved section and the pivot position; $B_{LUD}$ is the angle of upward tilt of the planar section 22 relative to a vertical plane normal to the centerline of the vehicle; $M_{LDP}$ is the length from the bottom edge of the planar section to the pivot position of the left mirror; $M_{LD}$ is the length from the far edge of the bottom curved section to the pivot position of the left mirror; $d_L$ is the forward distance from the driver's eyes to the inner edge of the left mirror; p is the vertical distance of the driver's eyes above the ground; $l_L$ is the vertical distance between ground and the pivot point of the left side mirror; $G_{LD}$ is the forward angle from vertical of a second left reference point.

5. The curved left rearview mirror of claim 2, wherein the radius of curvature $r_{LU}$ of said upper curved section is determined by the equations:

$$I_{LU} = 90 - B_{LUD} - \frac{1}{2}\left[\arctan\frac{d_L + M_{LU} \cdot \sin(B_{LUD} + D_{LU})}{p - l_L - M_{LU} \cdot \cos(B_{LUD} + D_{LU})} + \arctan\frac{d_L + M_{LU} \cdot \sin(B_{LUD} + D_{LU}) - (j_L - p)\tan G_{LU}}{j_L - l_L - M_{LU} \cdot \cos(B_{LUD} + D_{LU})}\right]$$ (Equation 16)

$$K_{LU} = \frac{M_{LUP}}{M_{LU}} = \frac{\sin\left(\frac{I_{LU}}{2} - D_{LU}\right)}{\sin\left(\frac{I_{LU}}{2}\right)}$$ (Equation 17)

$$r_{LU} = \frac{M_{LU}\sqrt{K_{LU}^2 + 1 - 2 \cdot K_{LU} \cdot \cos D_{LU}}}{2 \cdot \sin\left(\frac{I_{LU}}{2}\right)}$$ (Equation 18)

wherein $I_{LU}$ is an intermediate calculated value; $D_{LU}$ is the angle between the planar section and a plane including the far edge of the upper or top curved section and the pivot position; $d_L$ is the forward distance from the driver's eyes to the inner edge of the left mirror; $M_{LUP}$ is the distance of the top edge of the planar section to the pivot position of the left mirror; $M_{LU}$ is the length from the far edge of the top curved section to the pivot position of the left mirror; $D_{LU}$ is the angle between the planar section and a plane including the far edge of the top or upper curved section and the pivot position of the left mirror; p is the vertical distance of the driver's eyes above the ground; $l_L$ is the vertical distance between ground and the pivot point of the left side mirror; and $j_L$ is the vertical distance between the ground and the left side of the vehicle roof.

6. The curved left rearview mirror of claim 2, wherein said pivot position is located along the left side of the vehicle, the vehicle being a right hand drive vehicle, and the radius of curvature $r_L$ of said left curved section is determined by the equations:

$$I_L = B_L + \frac{1}{2}\left[\arctan\frac{d_L - M_L \cdot \sin(B_L - D_L)}{a - e + f_L + M_L \cdot \cos(B_L - D_L)} - \arctan\frac{d_L - M_L \cdot \sin(B_L - D_L) - (g_L + a - e)\tan G_L}{g_L - f_L - M_L \cdot \cos(B_L - D_L)}\right]$$ (Equation 10)

$$K_L = \frac{M_{LP}}{M_L} = \frac{\sin\left(\frac{I_L}{2} - D_L\right)}{\sin\left(\frac{I_L}{2}\right)}$$ (Equation 11)

$$r_L = \frac{M_L\sqrt{K_L^2 + 1 - 2 \cdot K_L \cdot \cos D_L}}{2 \cdot \sin\left(\frac{I_L}{2}\right)}$$ (Equation 12)

wherein $I_L$ is an intermediate calculated value; $B_L$ is the angle between the face of the left mirror and lateral; $d_L$ is the forward distance from the driver's eyes to the inner edge of the left mirror; a is the lateral distance between the left side and the right side of the vehicle; $M_{LP}$ is the length from the left edge to the right edge of the planar section of the left mirror; $M_L$ is the length from the far left edge of the curved section to the right inner edge of the left mirror; $D_L$ is the angle between the planar section and a plane including the far edge of the left curved section and the inner right edge of the left mirror; e is the lateral distance between the drivers s eyes and the left side of the vehicle; $f_L$ is the lateral distance between the left side of the vehicle and the inner edge of the left mirror; $g_L$ is the lateral distance from the left side of the vehicle and a selected first left reference point; and $G_L$ is the angle between lateral and said first reference point.

7. A curved right rearview mirror for a vehicle, comprising:
a body having a reflective front surface and a back surface, said front surface having:
a central planar section;
a right section having a constant radius of curvature and extending from a far right edge to said central planar section;
an upper section having a constant radius of curvature and extending from an upper far edge to said central planar section;
a bottom section having a constant radius of curvature and extending from a bottom far edge to said central planar section;
a pivot having a central axis and connected to the back of said body behind said central planar section, a point on the front surface of the mirror exactly opposite to said pivot along said central axis defining a pivot position;
wherein the ratio $K_R$ of the distance $M_{RP}$ from the right edge of the planar section to the inner left edge of the planar section to the distance $M_R$ from the far edge of the right curved section to the inner left edge of the right mirror is between about 1/10 and 9/10;

wherein the ratio $K_{RD}$ of the distance $M_{RDP}$ from the bottom edge of the planar section to said pivot position of said right mirror to the distance $M_{RD}$ from the far edge of the lower curved section to said pivot position is between about $\frac{1}{10}$ and about $\frac{9}{10}$; and wherein the ratio $K_{RU}$ of the distance $M_{RUP}$ from the top edge of the planar section to said pivot position to the distance $M_{RU}$ from the far top edge of the top curved section to said pivot position is between about $\frac{1}{10}$ and about $\frac{9}{10}$.

8. The curved right rearview mirror of claim 7, wherein said pivot position is located along the right side of the vehicle, the vehicle being a left hand drive vehicle, and the radius of curvature $r_R$ of said right curved section is determined by the equations:

$$I_R = B_R + \frac{1}{2}\left[\arctan\frac{d_R - M_R \cdot \sin(B_R - D_R)}{a - e + f_R + M_R \cdot \cos(B_R - D_R)} - \arctan\frac{d_R - M_R \cdot \sin(B_R - D_R) - (g_R + a - e)\tan G_R}{g_R - f_R - M_R \cdot \cos(B_R - D_R)}\right] \quad \text{(Equation 19)}$$

$$K_R = \frac{M_{RP}}{M_R} = \frac{\sin\left(\frac{I_R}{2} - D_R\right)}{\sin\left(\frac{I_R}{2}\right)} \quad \text{(Equation 21)}$$

$$r_R = \frac{M_R\sqrt{K_R^2 + 1 - 2 \cdot K_R \cdot \cos D_R}}{2 \cdot \sin\left(\frac{I_R}{2}\right)} \quad \text{(Equation 22)}$$

wherein $I_R$ is an intermediate calculated value; $B_R$ is the angle between the face of the right rearview mirror and lateral; $d_R$ is the forward distance from the driver's eyes to the inner edge of the right mirror; $M_{RP}$ is the length from the right edge of the planar section to the left edge of the planar section of the right mirror; $M_R$ is the length from the far right edge of the curved section to the left inner edge of the right mirror; $D_R$ is the angle between the planar section and a plane including the far edge of the right curved section and the inner left edge of the right rearview mirror; a is the lateral distance between the left side and the right side of the vehicle; e is the lateral distance between the driver's eyes and the left side of the vehicle; $f_R$ is the lateral distance between the right side of the vehicle and the inner edge of the right mirror; $g_R$ is the lateral distance from the right side of the vehicle and a selected first right reference point; and $G_R$ is the angle between lateral and said first reference point.

9. The curved right rearview mirror of claim 7, wherein the radius of curvature $r_{RD}$ of said lower curved section is determined by the equations:

$$I_{RD} = B_{RUD} + \frac{1}{2}\left[\arctan\frac{d_R - M_{RD} \cdot \sin(B_{RUD} - D_{RD})}{p - l_R + M_{RD} \cdot \cos(B_{RUD} - D_{RD})} - \arctan\frac{d_R - M_{RD} \cdot \sin(B_{RUD} - D_{RD}) - p \cdot \tan G_{RD}}{l_R - M_{RD} \cdot \cos(B_{RUD} - D_{RD})}\right] \quad \text{(Equation 23)}$$

$$K_{RD} = \frac{M_{RDP}}{M_{RD}} = \frac{\sin\left(\frac{I_{RD}}{2} - D_{RD}\right)}{\sin\left(\frac{I_{RD}}{2}\right)} \quad \text{(Equation 24)}$$

$$r_{RD} = \frac{M_{RD}\sqrt{K_{RD}^2 + 1 - 2 \cdot K_{RD} \cdot \cos D_{RD}}}{2 \cdot \sin\left(\frac{I_{RD}}{2}\right)} \quad \text{(Equation 25)}$$

wherein $I_{RD}$ is an intermediate calculated value; $D_{RD}$ is the angle between the planar section and a plane including the far edge of the bottom curved section and the pivot position; $B_{RUD}$ is the angle of upward tilt of the planar section relative to a vertical plane normal to the centerline of the vehicle; $M_{RDP}$ is the length from the bottom edge of the planar section to the pivot position of the right mirror; $M_{RD}$ is the length from the far edge of the bottom curved section to the pivot position of the right mirror; $d_R$ is the forward distance from the driver's eyes to the inner edge of the right mirror; p is the vertical distance of the driver's eyes above the ground; $l_R$ is the vertical distance between ground and the pivot point of the right side mirror; $G_{RD}$ is the forward angle from vertical of a selected second right reference point.

10. The curved right rearview mirror of claim 7, wherein the radius of curvature $r_{RU}$ of said upper curved section is determined by the equations:

$$I_{RU} = 90 - B_{RUD} - \frac{1}{2}\left[\arctan\frac{d_R + M_{RU} \cdot \sin(B_{RUD} + D_{RU})}{p - l_R - M_{RU} \cdot \cos(B_{RUD} + D_{RU})} + \arctan\frac{d_R + M_{RU} \cdot \sin(B_{RUD} + D_{RU}) - (j_R - p)\tan G_{RU}}{j_R - l_R - M_{RU} \cdot \cos(B_{RUD} + D_{RU})}\right] \quad \text{(Equation 26)}$$

$$K_{RU} = \frac{M_{RUP}}{M_{RU}} = \frac{\sin\left(\frac{I_{RU}}{2} - D_{RU}\right)}{\sin\left(\frac{I_{RU}}{2}\right)} \quad \text{(Equation 27)}$$

$$r_{RU} = \frac{M_{RU}\sqrt{K_{RU}^2 + 1 - 2 \cdot K_{RU} \cdot \cos D_{RU}}}{2 \cdot \sin\left(\frac{I_{RU}}{2}\right)} \quad \text{(Equation 28)}$$

wherein $I_{RU}$ is an intermediate calculated value; $D_{RU}$ is the angle between the planar section and a plane including the far edge of the upper curved section and the pivot position; $B_{RUD}$ is the angle of upward tilt of the planar section relative to a vertical plane normal to the centerline of the vehicle; $d_R$ is the forward distance from the driver's eyes to the inner edge of the right mirror; $M_{RUP}$ is the length form the top edge of the planar section to the pivot position of the right mirror; $M_{RU}$ is the length from the far edge of the top curved section to the pivot position of the right mirror; p is the vertical distance of the driver's eyes above the ground; $l_R$ the vertical distance between ground and the pivot point of the right side mirror; and $j_R$ is the vertical distance between the ground and the right side of the vehicle roof.

11. The curved left rearview mirror of claim 7, wherein said pivot position is located along the right side of the vehicle, the vehicle being a right hand drive vehicle, and the radius of curvature $r_R$ of said right curved section is determined by the equations:

$$I_R = B_R + \frac{1}{2}\left[\arctan\frac{d_R - M_R \cdot \sin(B_R - D_R)}{e + f_R + M_R \cdot \cos(B_R - D_R)} - \right.$$
$$\left.\arctan\frac{d_R - M_R \cdot \sin(B_R - D_R) - (g_R + e)\tan G_R}{g_R - f_R - M_R \cdot \cos(B_R - D_R)}\right]$$
(Equation 20)

$$K_R = \frac{M_{RP}}{M_R} = \frac{\sin\left(\frac{I_R}{2} - D_R\right)}{\sin\left(\frac{I_R}{2}\right)}$$
(Equation 21)

$$r_R = \frac{M_R\sqrt{K_R^2 + 1 - 2 \cdot K_R \cdot \cos D_R}}{2 \cdot \sin\left(\frac{I_R}{2}\right)}$$
(Equation 22)

wherein $I_R$ is an intermediate calculated value; $B_R$ is the angle between the face of the right mirror and lateral; $d_R$ is the forward distance from the driver's eyes to the inner edge of the right rearview mirror; $M_{RP}$ is the length from the right edge of the planar section to the left edge of the planar section of the right mirror; $M_R$ is the length from the far right edge of the curved section to the left inner edge of the right mirror; $D_R$ is the angle between the planar section and a plane including the far edge of the right curved section and the inner left edge of the right mirror; e is the lateral distance between the driver's eyes and the right side of the vehicle; $f_R$ is the lateral distance between the right side of the vehicle and the inner edge of the right mirror; $g_R$ is the lateral distance from the right side of the vehicle and a selected first right reference point; and $G_R$ is the angle between lateral and said first right reference point.

12. A curved rearview mirror system for vehicles, comprising:
a central rearview mirror having a central planar section, a convexly curved left section, and a convexly curved right section;
a left rearview mirror having a central planar section, a convexly curved left side section, a convexly curved top side section, and a convexly curved bottom side section; and
a right rearview mirror having a central planar section, a convexly curved right side section, a convexly curved top side section, and a convexly curved bottom side section;
wherein each of said curved sections has a constant radius of curvature;
a pivot having a central axis and connected to the back of said body behind said central planar section of said curved central mirror, a point on the front surface of the mirror exactly opposite to said pivot along said central axis defining a pivot position;
wherein the ratio $K_{ML}$ of the distance from the left side of the planar section to said pivot position to the distance from said left far edge to said pivot position is between about 1/10 and 9/10; and
wherein the ratio $K_{MR}$ of the distance from the right side of the planar section to said pivot position to the distance from said right far edge to said pivot position is between about 1/10 and 9/10.

13. A curved rearview mirror system for vehicles, comprising:
a central rearview mirror having a central planar section, a convexly curved left section, and a convexly curved right section;
a left rearview mirror having a central planar section, a convexly curved left side section, a convexly curved top side section, and a convexly curved bottom side section;
a right rearview mirror having a central planar section, a convexly curved right side section, a convexly curved top side section, and a convexly curved bottom side section;
wherein each of said curved sections has a constant radius of curvature;
a pivot having a central axis and connected to the back of said body behind said central planar section of said left hand mirror, a point on the front surface of the mirror exactly opposite to said pivot along said central axis defining a pivot position;
wherein the ratio $K_L$ of the distance $M_{LP}$ from the left edge of the planar section to the right edge of the planar section to the distance $M_L$ from the far left edge of the left curved section to the right edge of the planar section is between about 1/10 and 9/10;
wherein the ratio $K_{LD}$ of the distance $M_{LDP}$ from the bottom edge of the planar section to said pivot position to the distance $M_{LD}$ from the far edge of the lower curved section to said pivot position is between about 1/10 and about 9/10; and
wherein the ratio $K_{LU}$ of the distance $M_{LUP}$ from the top edge of the planar section to said pivot position to the distance $M_{LU}$ from the far top edge of the top curved section to said pivot position is between about 1/10 and about 9/10.

14. A curved rearview mirror system for vehicles, comprising:
a central rearview mirror having a central planar section, a convexly curved left section, and a convexly curved right section;
a left rearview mirror having a central planar section, a convexly curved left side section, a convexly curved top side section, and a convexly curved bottom side section;
a right rearview mirror having a central planar section, a convexly curved right side section, a convexly curved top side section, and a convexly curved bottom side section;
wherein each of said curved sections has a constant radius of curvature
a pivot having a central axis and connected to the back of said body behind said central planar section of said right hand mirror, a point on the front surface of the mirror exactly opposite to said pivot along said central axis defining a pivot position;
wherein the ratio $K_R$ of the distance $M_{RP}$ from the right edge of the planar section to the inner left edge of the planar section to the distance $M_R$ from the far edge of the right curved section to the inner left edge of the right mirror is between about 1/10 and 9/10;
wherein the ratio $K_{RD}$ of the distance $M_{RDP}$ from the bottom edge of the planar section to said pivot position of said right mirror to the distance $M_{RD}$ from the far edge of the lower curved section to said pivot position is between about 1/10 and about 9/10; and
wherein the ratio $K_{RU}$ of the distance $M_{RUP}$ from the top edge of the planar section to said pivot position to the distance $M_{RU}$ from the far top edge of the top curved section to said pivot position is between about 1/10 and about 9/10.

* * * * *